United States Patent [19]

Ohta et al.

[11] Patent Number: 5,056,121
[45] Date of Patent: Oct. 8, 1991

[54] CIRCUIT FOR OBTAINING ACCURATE TIMING INFORMATION FROM RECEIVED SIGNAL

[75] Inventors: Shinji Ohta, Kawasaki; Misao Fukuda, Suginami; Toshitaka Tsuda, Yokohama, all of Japan

[73] Assignee: Fujitsu Limited, Kawasaki, Japan

[21] Appl. No.: 326,175

[22] Filed: Mar. 20, 1989

[30] Foreign Application Priority Data

| Mar. 19, 1988 | [JP] | Japan | 63-66387 |
| Mar. 19, 1988 | [JP] | Japan | 63-66388 |
| Jun. 27, 1988 | [JP] | Japan | 63-158915 |
| Aug. 19, 1988 | [JP] | Japan | 63-206158 |
| Aug. 19, 1988 | [JP] | Japan | 63-206159 |

[51] Int. Cl.$^5$ .............................................. H04L 7/00
[52] U.S. Cl. ................................... 375/118; 375/119; 307/510
[58] Field of Search ............... 375/96, 106, 108, 113, 375/118, 119; 370/100.1, 105.3; 307/510, 269; 328/63, 72, 155

[56] References Cited

U.S. PATENT DOCUMENTS

| 4,455,665 | 6/1984 | Kromer, III | 375/96 |
| 4,475,214 | 10/1918 | Gutleber | 375/102 |
| 4,583,048 | 4/1986 | Gumacos et al. | 375/96 |
| 4,694,468 | 9/1987 | Cullum | 375/101 |
| 4,769,816 | 9/1988 | Hochstadt et al. | 370/100 |

OTHER PUBLICATIONS

Mueller, K. H. et al., "Timing Recovery in Digital Syuchronous Data Receivers" IEEE Transaction of Communications, vol. COM-24, No. 5, May 1976, pp. 516–531.

*Primary Examiner*—Stephen Chin
*Attorney, Agent, or Firm*—Staas & Halsey

[57] ABSTRACT

A circuit for obtaining accurate timing information from a received signal, first, obtains an impulse response at a certain phase, which phase is determined based on a reference phase of a receiver clock, and then the obtained impulse response is compared with a reference level. As the reference level: a predetermined value just below the maximum value of the overall impulse response; an impulse response at another phase; or an impulse response at the same phase in a previous period, is used. The reference phase is controlled, according to the result of the comparison.

27 Claims, 19 Drawing Sheets

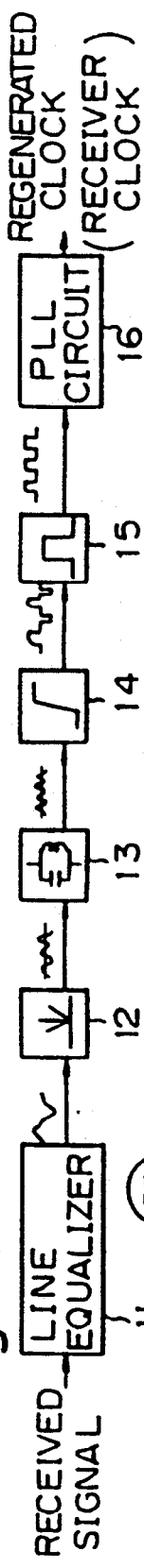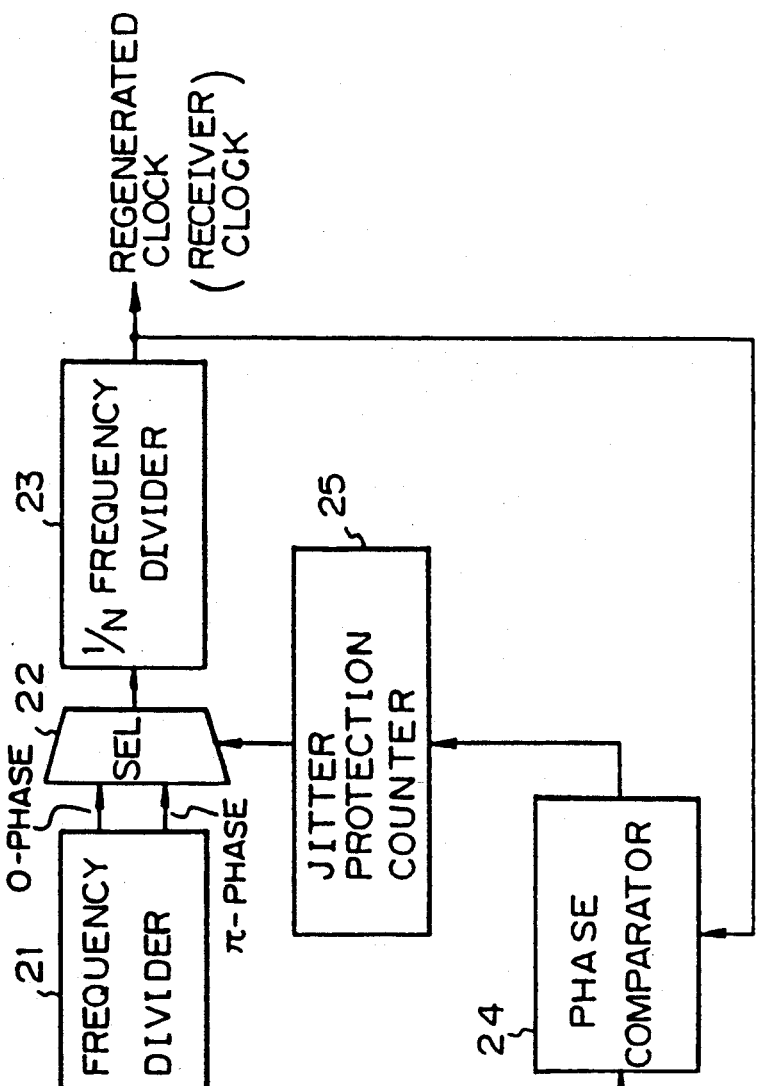

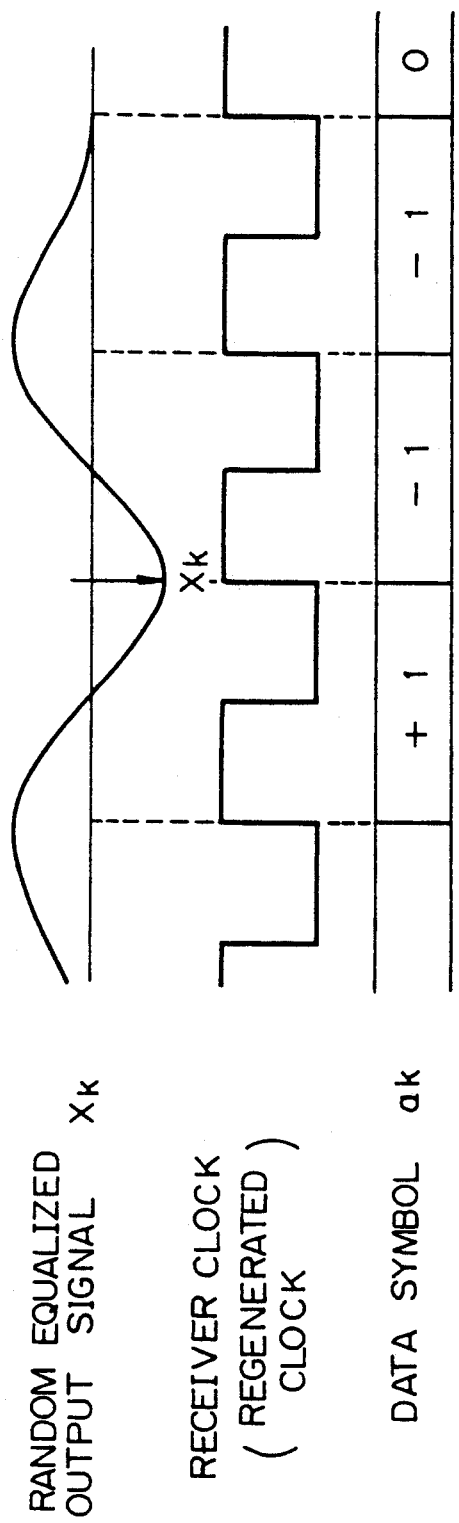

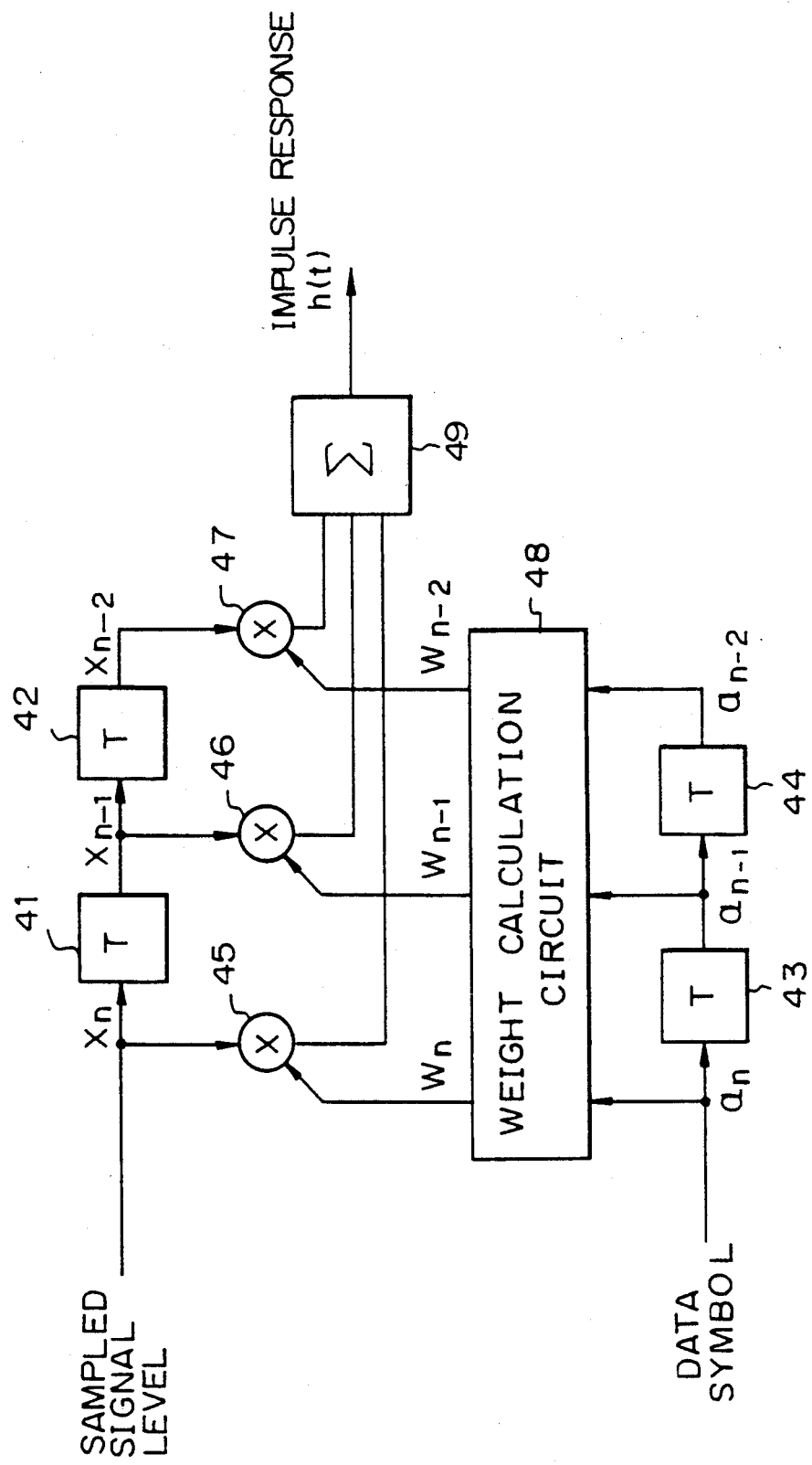

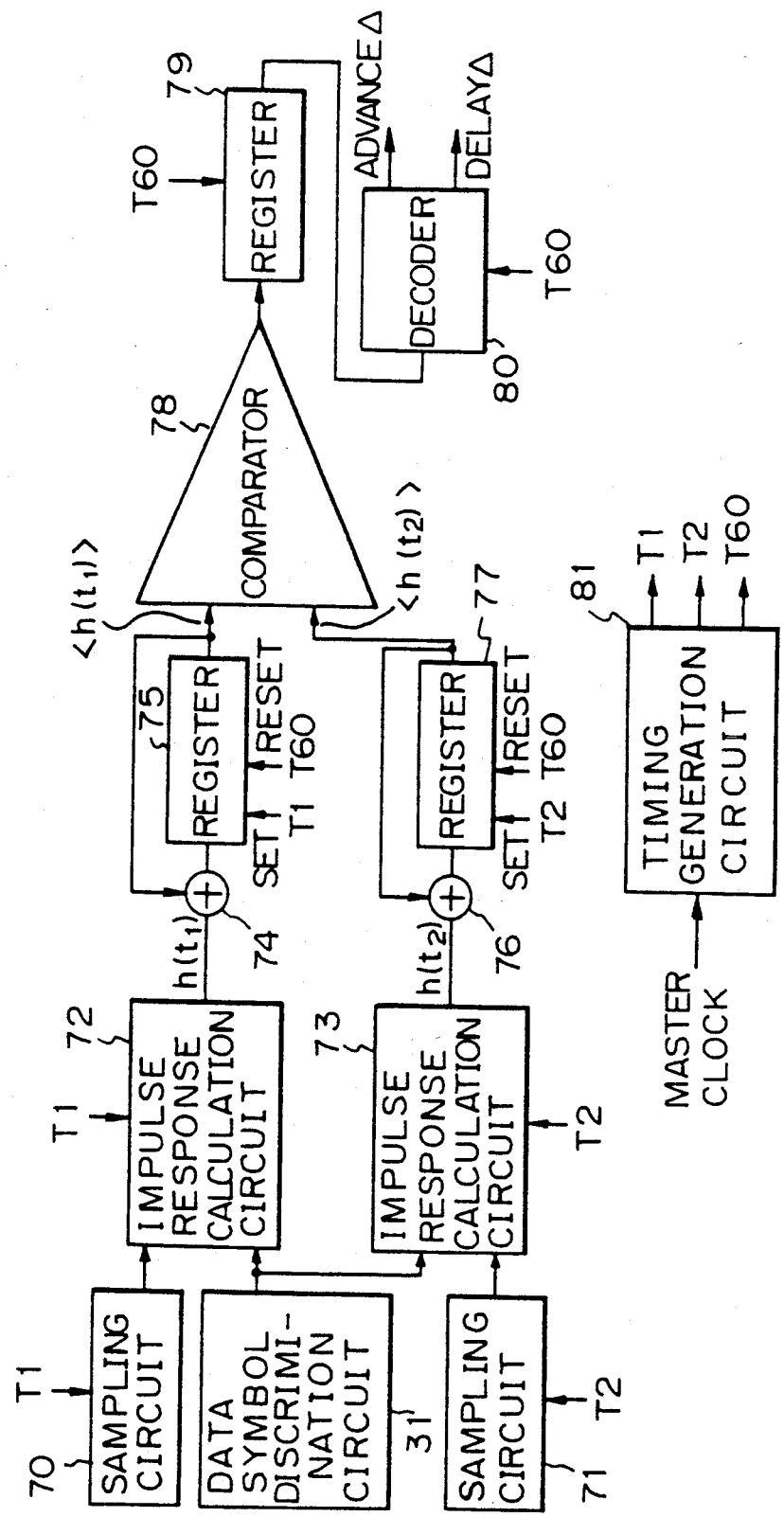

CIRCUIT FOR OBTAINING ACCURATE TIMING INFORMATION FROM RECEIVED SIGNAL

BACKGROUND OF THE INVENTION (1) Field of the Invention

The present invention relates to a circuit for obtaining accurate timing information from a received signal.

In synchronous digital data receivers, the receiver clock must be continuously synchronized in frequency and phase with the received data signal to optimize the sampling timing of the received data signal and to compensate for frequency drift between the transmitter of the data signal and the receiver clock.

For that purpose, generally, timing information is extracted from a received data signal in synchronous digital data receivers.

(2) Description of the Related Art

FIG. 1 shows a part of a conventional construction for extracting timing information from a received data signal.

In FIG. 1, reference numeral 11 denotes a line equalizer, 12 denotes a level shift circuit, 13 denotes a tank circuit, 14 denotes a limiter circuit, 15 denotes a rectifier circuit, and 16 denotes a pulse generator.

The line equalizer 11 equalizes, i.e., compensates for a distortion of a wave shape of the received data signal that is induced by the characteristics of a transmission line through which the data signal has been transmitted from a transmitter.

The equalized data signal is level-shifted by the level shift circuit 12, and is then input into the tank circuit 13.

The tank circuit 13, which is a pass-band circuit consisting of an L-C resonance circuit, extracts a band of frequency components including a predetermined clock frequency of the communication system at the center, from the output of the level shift circuit 12.

The output of the tank circuit 13 is input into the limiter circuit 14, and is then transformed into a rectangular shape, i.e., to a digital bipolar signal. The digital bipolar signal is rectified in the rectifier 15, and is then input into the pulse generator, which is realized by a phase-lock loop (PLL) circuit 16, as a reference timing signal.

FIG. 2 shows the construction of a conventional digital phase-lock loop (DPLL) circuit, as an example of PLL circuit 16 used in the construction of FIG. 1.

In FIG. 2, reference numeral 20 denotes a master oscillator, 21 denotes a ½ frequency divider, 22 denotes a selector, 23 denotes a 1/N frequency divider, 24 denotes a phase comparator, and 25 denotes a jitter protection circuit.

A master oscillator 20 generates a master clock, and the master clock is frequency-divided in the ½ frequency-divider 21. The ½ frequency-divider 21 outputs two types of frequency-divided timing signals, a 0-phase signal and a $\pi$-phase signal, where the phases of two signals differ in phase by $\pi$.

The selector 22 selects one of the 0-phase and $\pi$-phase signals under the control of the output of the jitter protection circuit 25, as described in the following. The output of the selector 22 is then input into the 1/N frequency divider 23. The output of the 1/N frequency divider 23, which is the receiver clock (regenerated clock), is input into the phase comparator 24, and then is compared with the above output of the rectifier 15.

The comparison result in the phase comparator 24 is output in a form of an up/down signal to the jitter protection circuit 25.

The jitter protection circuit 25 is, for example, made by an up/down counter, and increments or decrements its count according to whether it is receiving an up signal or a down signal from the phase comparator 24.

In the up/down counter, a maximum and a minimum counts are preset, and the initial count is set to a value between the maximum and minimum counts. Therefore, until the difference between the number of the up signals input and the number of the down signals input, exceeds the difference between the maximum and the initial count, or the difference between the number of the down signals input and the number of the up signals input, exceeds the difference between the initial count and the minimum, i.e., unless a substantial frequency (phase) difference is detected in the PLL loop, no effective output is applied to the selector 22 as the control input.

The output of the selector 22 is switched from the 0-phase signal to the $\pi$-phase signal when receiving an overflow output of the up/down counter 25, and therefore, the phase of the output of the selector 22, i.e., the phase of the output of the PLL circuit is delayed. The output of the selector 22 is switched from the $\pi$-phase signal to the 0-phase signal when receiving an underflow output of the up/down counter 25, and therefore, the phase of the selector 22, i.e., the phase of the output of the PLL circuit is advanced.

However, recently, there has been a strong demand for realization of an LSI circuit to reduce the scale of the circuitry and power loss. Nevertheless, it is impossible to realize the tank circuit 13 which includes a L-C circuit, in an LSI.

To realize circuitry to extract timing information from a received data signal in an LSI, a method comprising a step of obtaining a sampled impulse response value from sampled levels of the received data signal and data symbols detected from the received data signal through a calculation using a digital filter, is proposed by Muller et al. in IEEE trans. COM. vol. COM. 24, NO. 5, May 1976, pp 516~pp 531.

Generally, in a synchronous baseband data transmission system with an overall impulse response h(t), the output of the system, e.g., the output of a line equalizer in a receiver, is expressed as $$x(t) = \sum_{k=0}^{L} a_k h(t - kT)$$

where $a_k$ is a data symbol, T is a period of the transmitter clock, and $0 \leq k \leq L$, wherein it is supposed that an impulse response does not extend beyond the time LT from the timing of a peak of the impulse response.

If the level of the received data signal x(t) is sampled at the period T, as x(t), x(t+T), x(t+2T), ... x(t+LT), a series of sampled impulse responses h(t), h(t+T), h(t+2T), ... h(t+LT) can be obtained as a solution of a linear equation system consisting of a set of linear equations $$x(t) = \sum_{k=0}^{L} a_k h(t - kT)$$

$$x(t + T) = \sum_{k=0}^{L} a_{k-1} h(t + T - kT)$$

$$x(t + 2T) = \sum_{k=0}^{L} a_{k-2} h(t + 2T - kT)$$

.
.
.

$$x(t + LT) = \sum_{k=0}^{L} a_{k-L} h(t + LT - kT)$$

.
.
.

In the prior art, it is noted that the following two types of functions $f_A(\tau_A)$ and $f_B(\tau_B)$ become zero if the output of the line equalizer is a superposition of a plurality of ideal Nyquist pulses, each of which becomes O at $t = T$, and $-T$:

$$f_A(\tau_A) = \tfrac{1}{2}[h(\tau_A + T) - h(\tau_A - T)] \quad \text{(type A)}$$

and $$f_B(\tau_B) = h(\tau_B + T) \quad \text{(type B)}$$

where $\tau_A$ and $\tau_B$ are each a sampling phase.

FIG. 3 shows principles of the above-mentioned conventional methods for obtaining timing information from a received data signal.

In FIG. 3, $h_0$ denotes $h(\tau)$, $h_{-1}$ denotes $h(\tau - T)$, and $h_{+1}$ denotes $h(\tau + T)$.

In the method shown as type A, the sampling phase $\tau_A$ is controlled so that the function $f_A(\tau_A)$ is brought to zero, and in the method shown as type B, the sampling phase $\tau_B$ is controlled so that the function $f_B(\tau_B)$ is brought to zero.

FIG. 4 shows the construction for carrying out the above-mentioned conventional type B method for obtaining timing information from a received signal.

In FIG. 4, reference numeral 30 denotes a sampling circuit, 31 denotes a data symbol discriminating circuit, 32 denotes an impulse response calculation circuit, and 33 denotes a comparator.

The sampling circuit 30 samples a level of a received data signal $x(t)$ at a sampling phase, e.g., at the timing of the leading edge of the receiver clock, in each period.

The data symbol discriminating circuit 31 determines the data symbol of each time slot by discriminating the level of the received data signal $x(t)$ at a phase, e.g., at the timing of the leading edge of the receiver clock, in each period.

FIG. 5 shows a timing of sampling a level $x_k$ of a received signal $x(t)$, and discriminating a data symbol $a_k$ in a received signal.

FIG. 6 shows the construction of an example of an impulse response calculation circuit.

In FIG. 6, reference numerals 41 to 44 each denote a delay circuit with a delay time T, 45 to 47 each denote a multiplier, 48 denotes a weight calculation circuit, and 49 denotes a summation circuit. The period of the receiver clock is used for T, instead of the period of the real transmitter clock, which can be known indirectly in the receiver, i.e., as timing information extracted from the received data.

From the above-mentioned linear equation system, the impulse response $h_{+1} = h(\tau + T)$, and generally, $h(t)$ is expressed in the following form.

$$h(t) = W_n \times X_n + W_{n-1} \times X_{n-1} + W_{n-2} \times X_{n-2} + \ldots,$$

or $$h_{+1} = h(\tau + T) =$$

$$W_n \times X_n + W_{n-1} \times X_{n-1} + W_{n-2} \times X_{n-2} + \ldots,$$

where $W_n$'s are each a weight, and a function of the data symbols $a_k$.

Namely, the weight calculation circuit 48 calculates the above weights $W_n$, $W_{n-1}$, $W_{n-2}$, ..., the multipliers each carries out a multiplication $W_n \times X_n$, $W_{n-1} \times X_{n-1}$, $W_{n-2} \times X_{n-2}$ ..., and the summation circuit 49 carries out a summation of these terms. Thus, the impulse response $h(t)$ is obtained from the construction of FIG. 6.

However, in the above method, the function $f_A(\tau_A)$ or $f_B(\tau_B)$ does not become zero even when the sampling phase $\tau_A$ or $\tau_B$ is at the optimum phase, i.e., at the peak of the impulse response, due to noise and a residual distortion after the equalization. For example, a line impedance between the transmitter and the receiver varies during the operation of the communication system because a line is temporarily formed arbitrarily between two subscribers in a public telephone network system. Further, in some types of equalization, e.g., $\sqrt{f}$ equalization, the equalized wave shape is not symmetrical regarding $t = \tau$, and a non-zero impulse response in a pre-cursor ($t = \tau - T$) or in a post-cursor ($t = \tau + T$) is essential, as shown later.

FIG. 7 shows an example of the situation in which an error in a phase of the receiver clock is induced due to a distortion of an overall wave shape of an impulse response.

Namely, the method for obtaining timing information from a received data signal in the prior art is greatly affected by residual distortion after equalization, noise, or a wave shape of equalization.

On the other hand, at an initial pull-in operation, generally, an initial sampling phase is random, i.e., the initial sampling phase may be far from the optimum phase for sampling.

In the prior art, by whatever method the timing information in the received signal may be obtained, the operation to shift the phase of the receiver clock toward the optimum phase is carried out gradually as an accumulation of small shifts, for example, in a digital PLL circuit in FIG. 2, as explained before.

Namely, in the prior art, it takes a long time for the phase of the receiver clock to converge to the optimum phase.

SUMMARY OF THE INVENTION

The object of the present invention is to provide a circuit for obtaining accurate timing information from a received signal, which is not so affected by residual distortion after equalization, noise, or a wave shape of equalization.

Another object of the present invention is to provide a circuit for obtaining accurate timing information from a received signal, which can realize a rapid timing recovery in an initial pull-in operation.

According to the first aspect of the present invention, there is provided a circuit for obtaining accurate timing information from a received signal, comprising: an impulse response obtaining means for obtaining an impulse response at a phase which is determined by a reference phase of a receiver clock; an initial phase setting means for advancing the reference phase by a predetermined phase difference from the value of the reference phase just after an initial pull-in operation; a previous impulse response register means for holding an impulse response at the phase in a previous period of the receiver clock, as a reference level; and a comparator means for comparing the impulse response at the phase with the reference level.

According to the second aspect of the present invention, there is provided a circuit for obtaining accurate timing information from a received signal, comprising: an initial phase setting means for advancing the reference phase by a predetermined phase difference from the value of the reference phase just after an initial pull-in operation; an impulse response obtaining means for obtaining an impulse response at a phase which is determined by a reference phase of the receiver clock; a previous impulse response register means for holding an impulse response at the phase in a previous period of the receiver clock, as a reference level; and a comparator means for comparing the impulse response at the phase with the reference level, and promoting to advance or delay the reference phase of the receiver clock according to whether the impulse response at the phase is larger or smaller than the reference level.

According to the third aspect of the present invention, there is provided a circuit for obtaining accurate timing information from a received signal, comprising: an impulse response obtaining means for obtaining an impulse response at a reference phase; a comparator means for comparing the impulse response at the reference phase with a predetermined reference level, where the predetermined level is set so near to a maximum value of an overall impulse response that a phase corresponding to the reference level is within a required phase difference from a phase corresponding to the maximum value, and the comparator means shifts the reference phase toward the phase corresponding to the reference level.

According to the fourth aspect of the present invention, there is provided a circuit for obtaining accurate timing information from a received signal, comprising: a first impulse response obtaining means for obtaining an impulse response at a first phase; a second impulse response obtaining means for obtaining an impulse response at a second phase; a timing generation means for generating timings corresponding to the first and second phases determined based on a reference phase of a receiver clock, wherein the second phase differs by a predetermined phase difference from the first phase; and a comparator means for comparing the impulse responses at the first and second phases, and advancing or delaying the reference phase of the receiver clock according to whether the impulse response at the first phase is larger or smaller than the impulse response at the second phase so that a phase corresponding to the maximum value of an overall impulse response is near the center of the first and second phases.

According to the fifth aspect of the present invention, there is provided a circuit for obtaining accurate timing information from a received signal, comprising: an impulse response obtaining means for obtaining an impulse response at one phase; a timing generation means for generating a timing corresponding to the phase, based on a reference phase of a receiver clock; a previous impulse response register means for holding an impulse response at the phase in a previous period of the receiver clock; and a comparator means for comparing the impulse response at the phase with the impulse response in the previous period, and shifting the reference phase of the receiver clock in a direction the same as or opposite to the direction in which the reference phase of the receiver clock was shifted by a previous operation of the comparator means, according to whether the impulse response at that phase is larger or smaller than the impulse response in the previous period.

According to the sixth aspect of the present invention, there is provided a circuit for obtaining accurate timing information from a received signal, comprising: an impulse response obtaining means for obtaining an impulse response at a given phase; a phase control means for generating a first and second phases which are determined by subtracting a predetermined phase difference value from the value of a reference phase, and adding the predetermined phase difference value to the value of the reference phase, respectively; a comparator means for comparing the impulse responses at the first and second phases with each other, and shifting the reference phase of the receiver clock to one of the first and second phases the impulse response at which is larger than the other; and the phase control means decreases the predetermined phase difference after each shift is carried out, and the impulse response obtaining means, phase control means, and comparator means repeatedly operate until the reference phase falls within a required phase difference from a phase corresponding to a maximum value of an overall impulse response.

BRIEF DESCRIPTION OF THE DRAWINGS

In the drawings:

FIG. 1 shows an example of a conventional construction for generating a receiver clock synchronized with a received signal;

FIG. 2 shows the construction of a conventional digital phase-lock loop (DPLL) circuit;

FIG. 5 shows timings of sampling levels of a received signal, and discriminating data symbols in a received signal;

FIG. 6 shows the construction of an example of an impulse response calculation circuit;

FIG. 12 shows a part of the construction of a timing regeneration circuit as a second embodiment of the present invention;

DESCRIPTION OF THE PREFERRED EMBODIMENTS

All of the first to fifth embodiments of the present invention are useful in a timing circuit in a receiver which regenerates a receiver clock synchronized with a received data signal.

In particular, the first to fourth embodiments of the present invention are useful for obtaining accurate timing information from a received data signal and improving and keeping accurate synchronization of the receiver clock with the received signal while receiving data signals after an initial pull-in operation, and the fifth embodiment of the present invention is useful in the initial pull-in operation.

Figure 8:
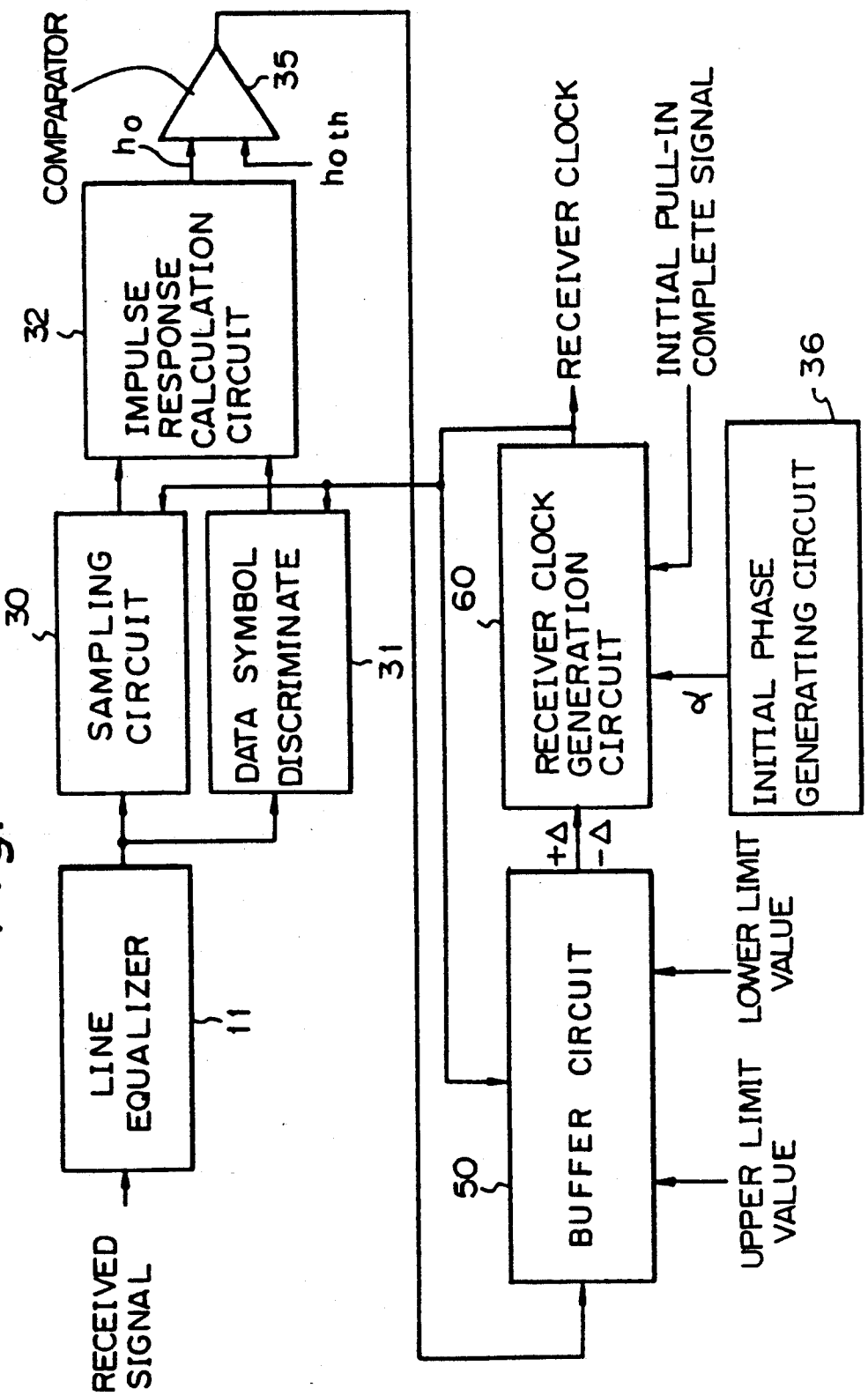
FIG. 8 is a block diagram of the construction of a timing regeneration circuit as a first embodiment of the present invention.

FIG. 8 shows the construction of the first embodiment of the present invention.

In FIG. 8, reference numeral 11 denotes a line equalizer, 30 denotes a sampling circuit, 31 denotes a data symbol discrimination circuit, 32 denotes an impulse response calculation circuit, 35 denotes a comparator, 50 denotes a buffer means, 60 denotes a receiver clock generation circuit, and 36 denotes an initial phase generation circuit.

Figure 3:
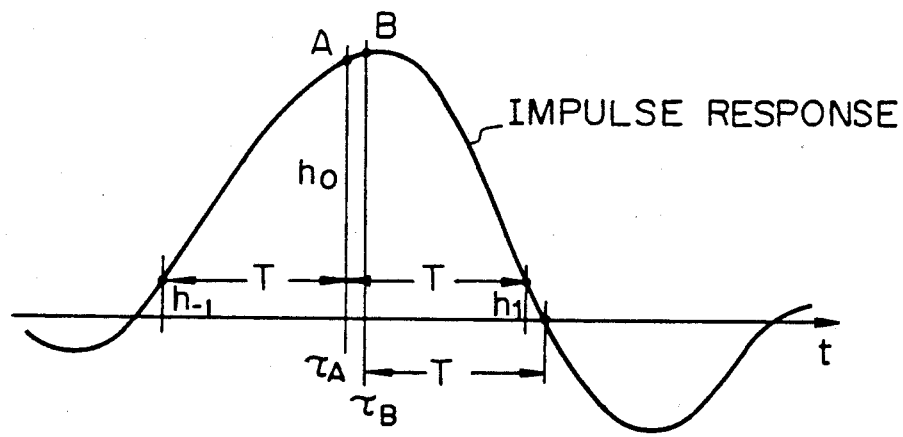
FIG. 3 shows principles of conventional methods for obtaining timing information from a received signal.
Figure 7:
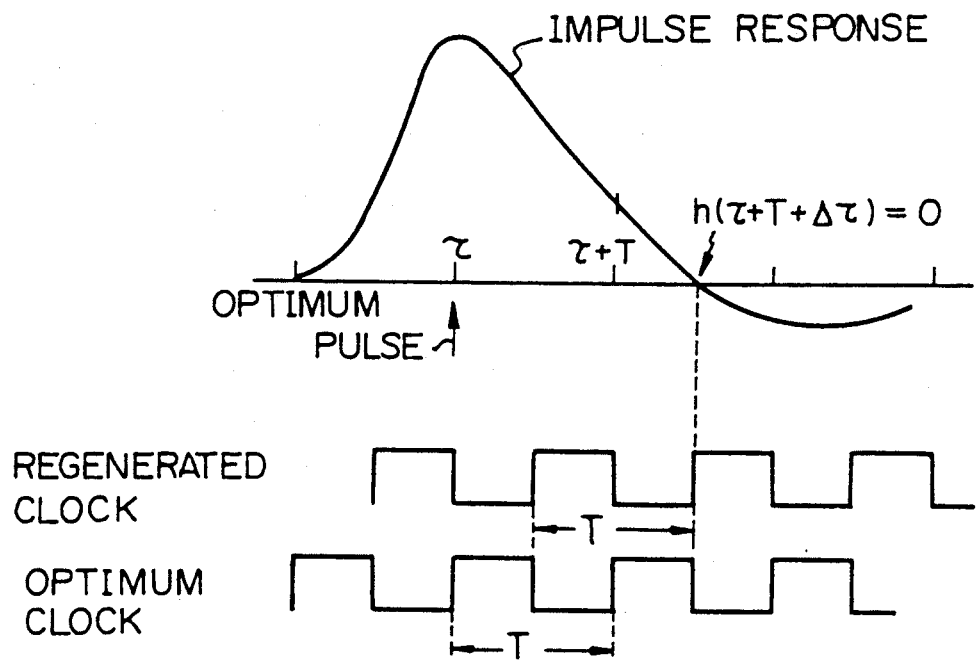
FIG. 7 shows a typical error which might be caused by the conventional method for obtaining timing information from a received signal.
Figure 4:
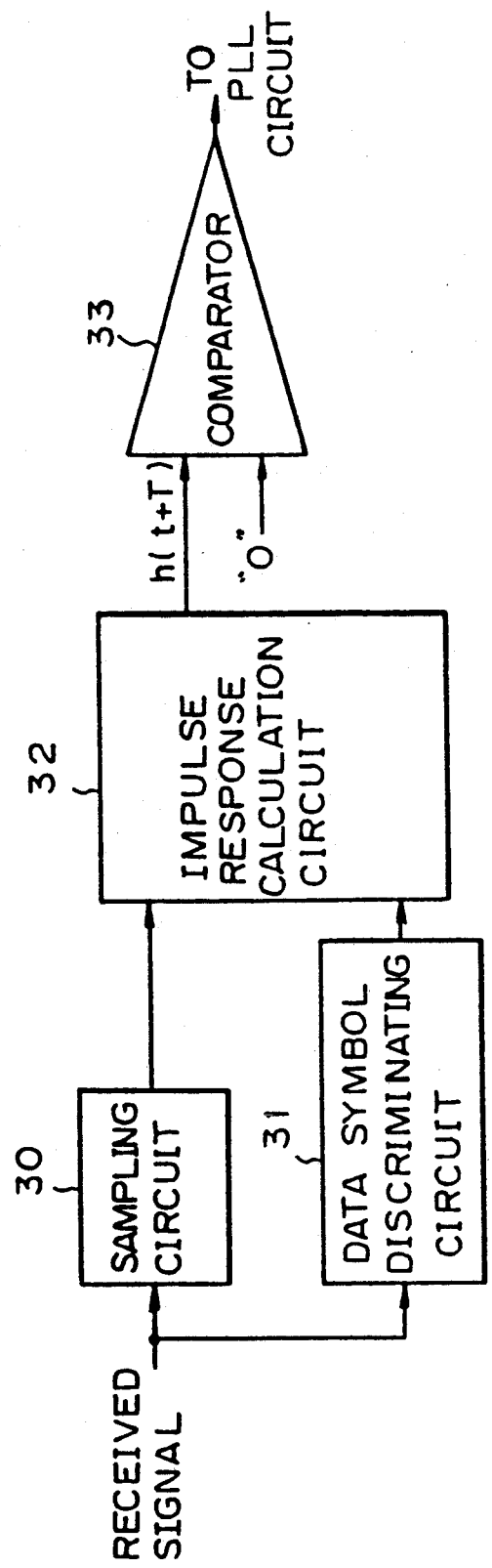
FIG. 4 shows another example of a conventional construction for obtaining timing information from a received signal.

The basic functions of the line equalizer 11, the sampling circuit 30, the data symbol discrimination circuit 31, and the impulse response calculation circuit 32 are the same as the functions of the corresponding construction in FIG. 4.

A difference from the construction of FIG. 4 is that the impulse response calculation circuit 32 in FIG. 8 calculates candidates of the peak value of the impulse response $h_o = h(\tau)$ where $\tau$ is a sampling time.

Figure 9:
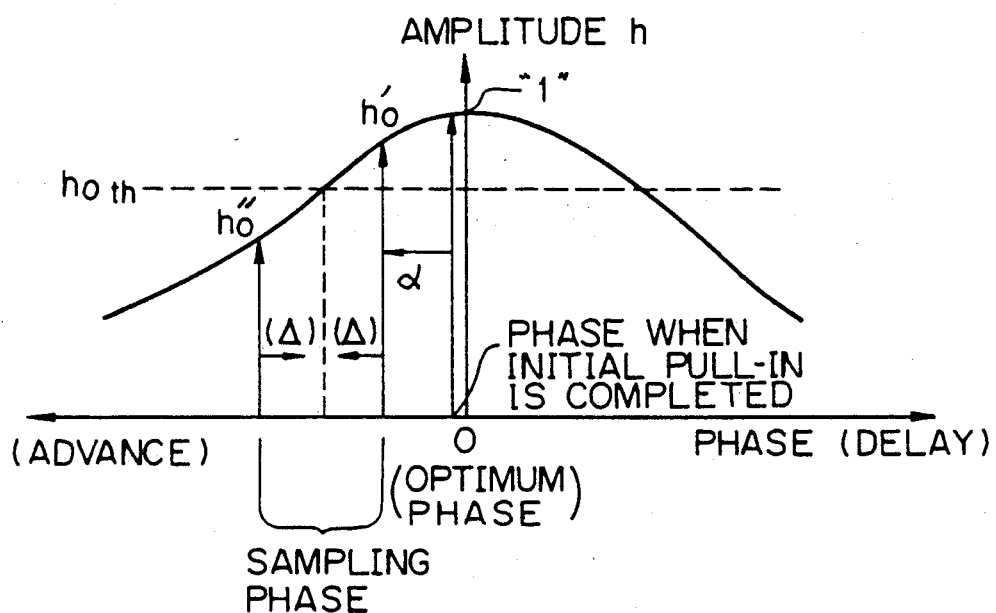
FIG. 9 shows an operation of the first embodiment of the present invention.

FIG. 9 shows a principle of the first embodiment of the present invention.

Another difference from the construction of FIG. 4, is that, as shown in FIG. 9, the predetermined reference level $h_{oth}$ is set so near the peak (maximum) value of the overall impulse response $h(t)$ that a phase corresponding to the reference level is within a required phase difference from the phase corresponding to the peak.

And the candidate of the peak value of the impulse response, for example, $h_o'$ or $h_o''$ as shown in FIG. 9 is compared with the reference level $h_{oth}$, and the phase of the sampling time is shifted toward the phase corresponding to the reference level according to the output of the comparator 35. The phase of a leading edge of the receiver clock (regenerated clock) is equal to the phase of the sampling time in this embodiment.

Preferably, the sampling phase is advanced or delayed by a predetermined phase difference from a phase where the reference phase (the phase of a leading edge of the receiver clock) was just after an initial pull-in operation, before starting the above operation. The initial pull-in operation is carried out when starting to receive a new communication signal to bring the phase of the receiver clock close to the timing extracted from the received signal. FIG. 9 shows an example wherein the sampling phase has been advanced by $\alpha$ just after an initial pull-in operation.

When the phase of the receiver clock is initially advanced, the control of the phase shift is carried out on the left side of the peak in FIG. 9. Thus, in this case, the sampling phase, i.e., the reference phase is advanced or delayed according to whether the impulse response at that phase is larger or smaller than the predetermined reference level.

When the phase of the receiver clock is initially delayed, i.e., when the sampling phase is delayed by a predetermined phase difference from a phase where the reference phase (the phase of a leading edge of the receiver clock) was just after an initial pull-in operation, the sampling phase, i.e., the reference phase, is advanced or delayed according to the output of the comparator 35, i.e., according to whether the impulse response at the phase is smaller or larger than the predetermined reference level.

More preferably, the buffer means 50 for accumulating the outputs of the comparator 35, is provided. The buffer means accumulates the digital output of the comparator 35, i.e., increments its count when the digital output of the comparator 35 is "1", i.e., when the level of the calculated candidate of the peak value of the impulse response is larger than the reference level $h_{oth}$, or the buffer means 50 decrements its count when the digital output of the comparator 35 is "0", i.e., when the level of the calculated candidate of the peak value of the impulse response is smaller than the reference level $h_{oth}$.

When the count reaches an upper limit value, which has been set in advance, the buffer means 50 outputs a control signal to shift the sampling phase, i.e., to shift the phase of the receiver clock in a direction toward the phase corresponding to the reference level; or when the count reaches a lower limit value, which has been also set in advance, the buffer means 50 outputs a control signal to shift the phase of the receiver clock in the direction opposite to the above, i.e., in the other direction toward the phase corresponding to the reference level.

Therefore, due to the function of the buffer means 50, the phase of the sampling clock, i.e., the phase of the receiver clock is not shifted by a fluctuation of the calculated candidate value of the impulse response, which may be affected by a noise superimposed on the received data signal $x(t)$.

Figure 10:
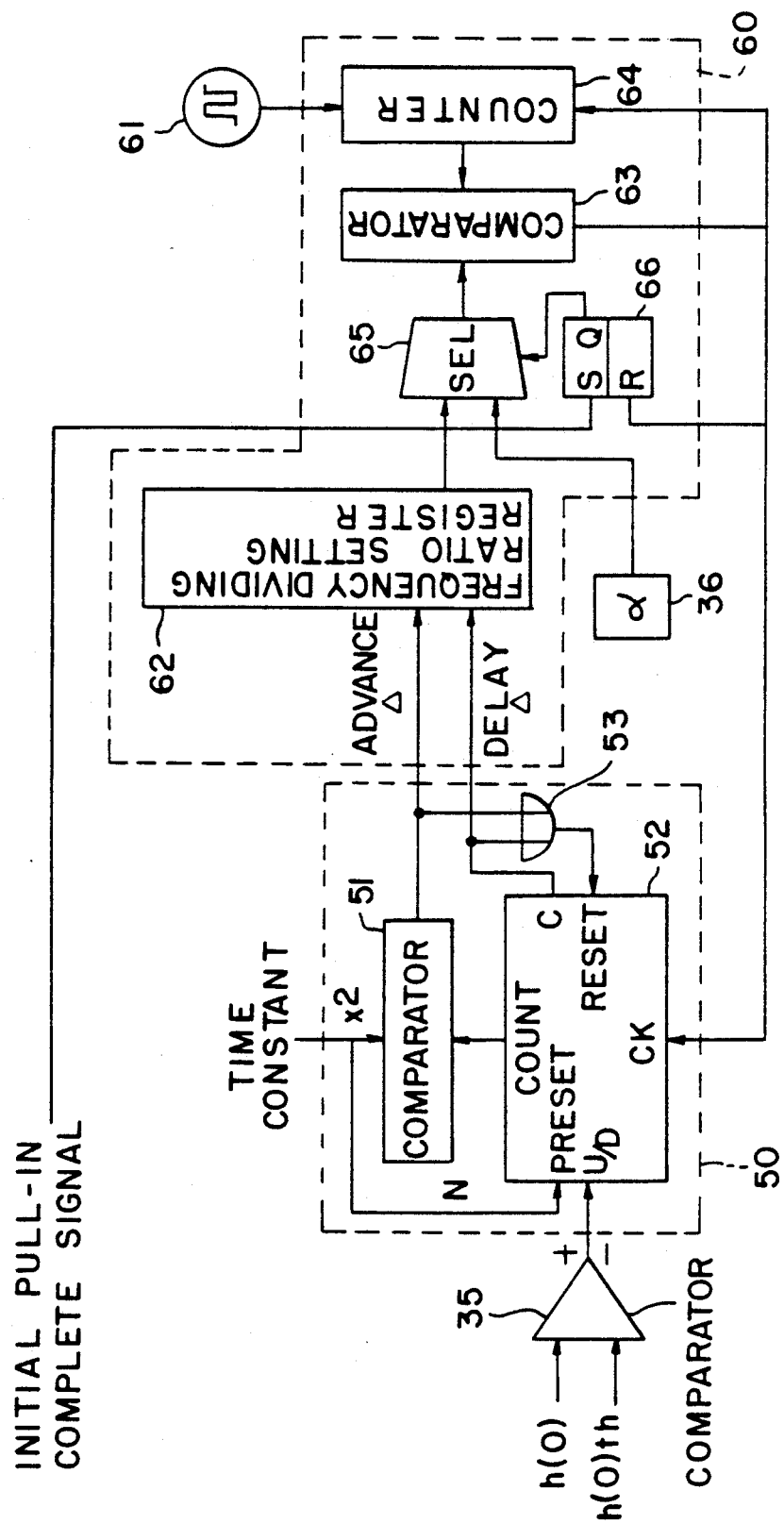
FIG. 10 shows a detailed construction of the circuit of FIG. 8.

The realization of the buffer means 50 is shown in FIG. 10 together with a realization of the receiver clock generation circuit 60.

In FIG. 10, the buffer means 50 is constructed by a comparator 51, an up/down counter 52, an OR gate 53, and a multiplier (not shown).

Half of the above upper limit value 2N, N is preset as an initial count of the up/down counter 52, and the output of the comparator 35 is applied as an up or down input of the up/down counter 52. The count of the up/down counter 52 is incremented or decremented according to whether the digital output of the comparator 35 is "1" or "0" at each timing of the leading edge of the receiver clock. The count output of the up/down counter 52 is input into the comparator 51.

A reference value with which the input is compared in the comparator 51 is the above upper limit value 2N, which has been preset in advance.

The lower limit value is zero in the example of FIG. 10, which is detected as a minimum output (zero count), which becomes active when the count becomes zero, in the up/down counter 52, and the minimum output is used as a control signal to delay (when the sampling phase was initially advanced as shown in FIG. 9) the sampling, i.e., the phase of the receiver clock.

Thus the above value N plays the role of a time constant in the count-integrating function of the buffer means 50.

When the count of the up/down counter 52 reaches the upper limit value 2N, the comparator 51 detects that the count accords with the upper limit value 2N, and makes its output active. This active output of the comparator 51 is used as a control signal to advance (when the sampling phase was initially advanced as shown in FIG. 9) the sampling phase, i.e., the phase of the receiver clock.

When one of the control signals to advance or delay the sampling phase becomes active, the active signal resets the count of the up/down counter 52 through the OR gate 53.

The receiver clock generation circuit 60 shown in FIG. 10 is constructed by a frequency dividing ratio setting register 62, a comparator 63, a counter 64, a selector 65, and an RS type flip-flop circuit 66.

The receiver clock generation circuit 60 shown in FIG. 10 functions as a frequency divider, wherein the phase of the output signal can be shifted by control from the outside.

The frequency dividing ratio setting register 62 holds a frequency dividing ratio which is determined as a ratio of the frequency of the master clock to the receiver clock.

The selector 65 and the RS type flip-flop circuit 66 are provided for receiving the aforementioned initial phase shift operation, and normally (after the initial phase shift operation is completed), selects the output of the frequency dividing ratio setting register 62 as an output. First, the above normal operation of the receiver clock generation circuit 60 is explained in the following. The operation in the initial phase shift is explained later.

The count of the counter 60 is incremented at each leading edge of the master oscillator 61 of the receiver. The count is compared with the value of a frequency dividing ratio held in the frequency dividing ratio setting register 62. When the count accords with the value held in the register 62, the output of the comparator 63 becomes active, i.e., the receiver clock rises, and the counter 64 is then reset by the active signal.

While the value held in the register 62 is constant, the receiver clock rises when the count of the counter 64 reaches the value held in the register 62, i.e., the frequency of the master clock is divided by the value held in the register 64. However, the value held in the register 64 is decremented when receiving the active control signal from the comparator 51, or is incremented when receiving the active control signal from the minimum count output terminal of the up/down counter 52.

Therefore, the phase of the output of the receiver clock generation circuit 60 (the phase of the receiver clock), is advanced (i.e., the frequency of the receiver clock is increased) when receiving the active control signal from the comparator 51, or the phase of the receiver clock is delayed (i.e., the frequency of the receiver clock is decreased) when receiving the active control signal from the minimum count output terminal of the up/down counter 52.

As readily understood, the frequency dividing ratio setting register 62 having the above function, can be realized by an up/down counter.

To carry out the aforementioned initial phase shift of the sampling phase, a predetermined value is held in the initial phase generation circuit 36. When receiving an initial pull-in completion signal, the signal sets the RS flip-flop circuit 66, and the selector 65 selects the output of the initial phase generation circuit 36 as its output. The predetermined value is so much smaller than the frequency dividing ratio held in the frequency dividing ratio setting register 62 that the phase of the receiver clock is advanced because the rising time of the output of the comparator 63 is advanced due to the decreased reference value for the comparison, and the resultant phase shift is near a predetermined value, for example, T/10.

Figure 11:
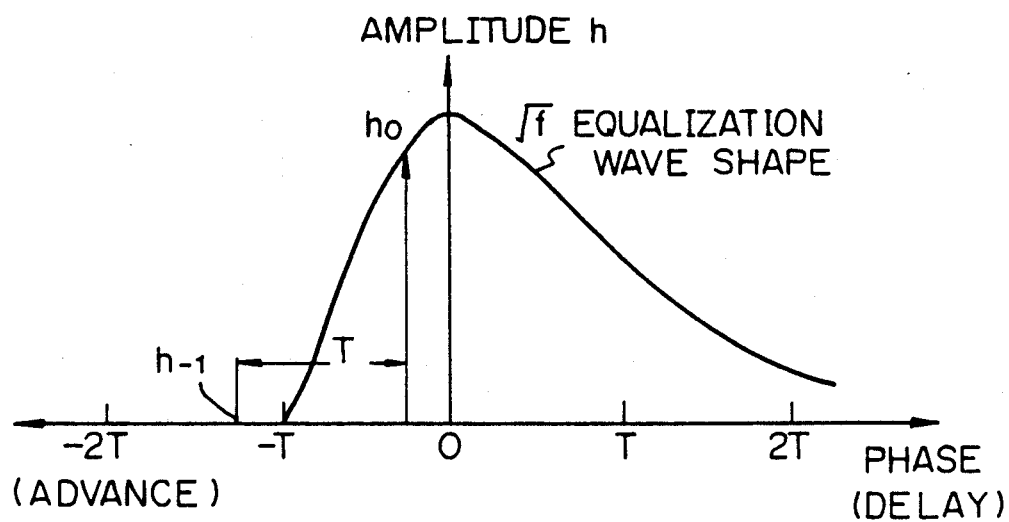
FIG. 11 shows an operation of the first embodiment of the present invention, when the impulse response is obtained after the $\vee$ f type equalization.

In addition, when the equalized output of the line equalizer 11 has the wave shape as shown in FIG. 11, which is called a $\sqrt{f}$ equalized wave shape, and which is usually used, the impulse response is zero before the phase $-T$. Namely, when using this type of equalization, it is not necessary to take into account the sampled impulse response value before the time $-T$, and therefore, the calculation in the impulse response calculation circuit of FIG. 6 is simplified, i.e., the impulse response calculation circuit itself can be simplified.

FIG. 12 shows the construction of the second embodiment of the present invention.

In FIG. 12, reference numeral 70 and 71 each denote a sampling circuit, 31 denotes a data symbol discrimination circuit, 72 and 73 each denote an impulse response calculation circuit, 74 and 76 each denote an adder, 75, 77, and 79 each denote a register, 78 denotes a comparator, 80 denotes a decoder, and 81 denotes a timing generation circuit.

The basic functions of the sampling circuits 70 and 71, the data symbol discrimination circuit 31, the impulse response calculation circuits 72 and 73, and the comparator 78 are individually the same as the functions of the corresponding constructions in FIGS. 4 and 8.

The difference exists in that the sampling in the sampling circuit 70 and the determination in the data symbol discrimination circuit 31, are carried out at a first phase t1, and the impulse response calculation circuit 72 calculates the impulse response at the phase t1, h(t1). The sampling in the sampling circuit 71 is carried out at a second phase t2, and the impulse response calculation circuit 73 calculates the impulse response at the phase t2, h(t2), wherein t1 and t2 are each a first and second phases which are determined based on the phase of the receiver clock, both are near the phase corresponding to the peak of the impulse response, and one of the first phase is different from the second phase by a predetermined phase difference, for example, $t2-t1=2\Delta$ as shown in FIG. 13.

Figure 13:
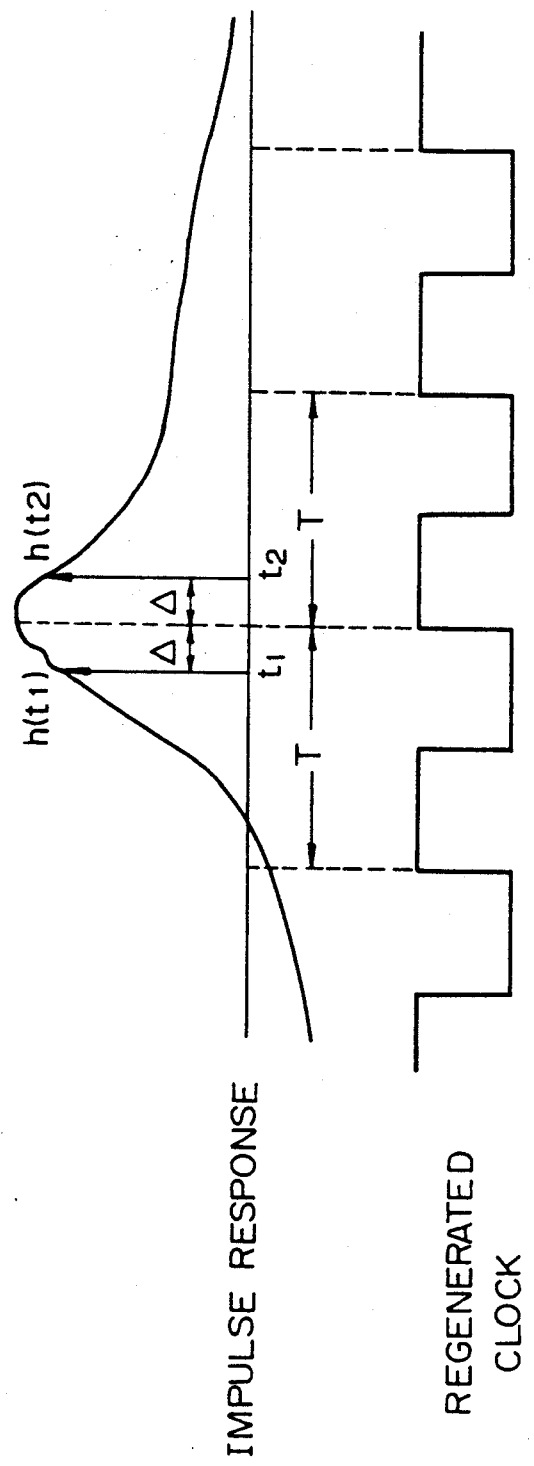
FIG. 13 shows an operation of the second embodiment of the present invention.

FIG. 13 shows a principle of the second embodiment of the present invention.

Namely, the impulse response $h(t1)$ at the phase $t1$ and the impulse response $h(t2)$ at the phase $t2$ are compared with each other, and based on the comparison result, the phase of the receiver clock is shifted (advanced or delayed) so that the phase corresponding to the maximum value is near the center of the first and second phases, for example, if $h(t1)>h(t2)$, the phase of the receiver clock is advanced; and if $h(t1)<h(t2)$, the phase of the receiver clock is delayed.

Preferably, in the embodiment of FIG. 12, the output $h(t1)$ of the impulse response calculation circuit 72 is averaged (actually summed only, and the word "average" is used with the same meaning hereinafter) for a predetermined number of periods in an average circuit comprising the adder 74 and the register 75, and the output $h(t2)$ of the impulse response calculation circuit 76 is averaged for a predetermined number of periods in another average circuit comprising the adder 76 and the register 77.

The averaged value $<h(t1)>$ of the impulse responses $h(t1)$ at the phase $t1$ and the averaged value $<h(t2)>$ of the impulse responses $h(t2)$ at the phase $t2$ are compared with each other in the comparator 78, and the output of the comparator 78 is held in the register 79, and is then transformed into control signals to advance and delay the phase of the receiver clock in the decoder 80. These control signals can function the same as the corresponding control signals in the construction of FIG. 10, and are applied to the receiver clock generation circuit 60 as shown in FIG. 10, where the aforementioned initial phase generating circuit 36 is not necessary in the second embodiment.

Further, a buffer means 50 as described in FIG. 10 can be provided after the register 79 instead of the decoder 80, to reduce jitter due to fluctuations of the impulse response.

According to the construction of FIG. 12, when the averaged value $<h(t1)>$ of the impulse responses $h(t1)$ at the phase $t1$ is larger than the averaged value $<h(t2)>$ of the impulse responses $h(t2)$ at the phase $t2$, the output of the comparator 78 is "1", and the control signal to advance the phase of the receiver clock is then output from the decoder 80, or when the averaged value $<h(t1)>$ of the impulse responses $h(t1)$ at the phase $t1$ is smaller than the averaged value $<h(t2)>$ of the impulse responses $h(t2)$ at the phase $t2$, the output of the comparator 78 is "0", and the control signal to delay the phase of the receiver clock is then output from the decoder 80.

In addition, by using the average circuits, the phase of the receiver clock is not shifted by a fluctuation of the calculated value of the impulse response, which may be affected by a noise superimposed on the received data signal $x(t)$.

The above-mentioned predetermined number of periods for averaging is, for example, sixty, and T60 denotes a 1/60 frequency-divided clock generated from the receiver clock, which has a period sixty times that of the receiver clock.

The 1/60 frequency-divided clock T60, and a clock T1 having a frequency equal to the receiver clock and a phase of $t1$, and a clock T2 having a frequency equal to the receiver clock and a phase of $t2$, are generated in the timing generation circuit 81. The timing generation circuit 81 comprises delay circuits and frequency dividing circuits (not shown), and generates the above T1, T2, and T60 from the master clock having a much higher frequency than the receiver clock.

To obtain timing information with high accuracy, a master clock having a high frequency is necessary, for example, 3.2 MHz for a receiver clock having a frequency of 80 kHz.

Figure 14:
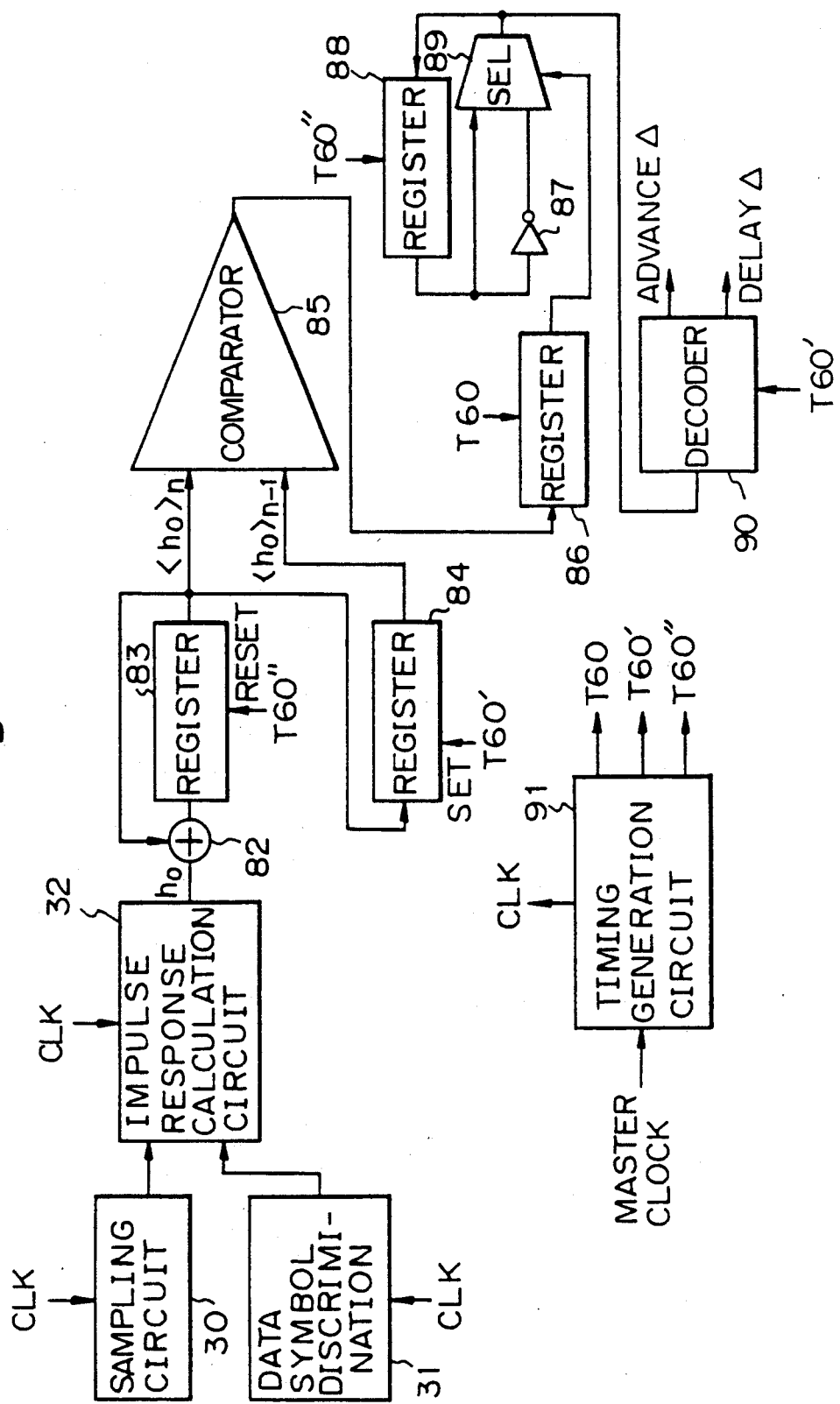
FIG. 14 shows a part of the construction of a timing regeneration circuit as a third embodiment of the present invention.

FIG. 14 shows the construction of the third embodiment of the present invention.

In FIG. 14, reference numeral 30 denotes a sampling circuit, 31 denotes a data symbol discrimination circuit, 32 denotes an impulse response calculation circuit, 82 denotes an adder, 83, 84, 86, and 88 each denote a register, 85 denotes a comparator, 87 denotes an inverter, 89 denotes a selector, 90 denotes a decoder, and 91 denotes a timing generation circuit.

The basic functions of the sampling circuit 30 and 71, the data symbol discrimination circuit 31, the impulse response calculation circuit 32, and the comparator 85 are individually the same as the functions of the corresponding constructions in FIGS. 4 and 8.

The sampling in the sampling circuit 30 and the determination in the data symbol discrimination circuit 31, are carried out at the phase of the leading edge of the receiver clock, and the impulse response calculation circuit 32 calculates the impulse response $h_o$ at the phase of the leading edge of the receiver clock.

Figure 15A:
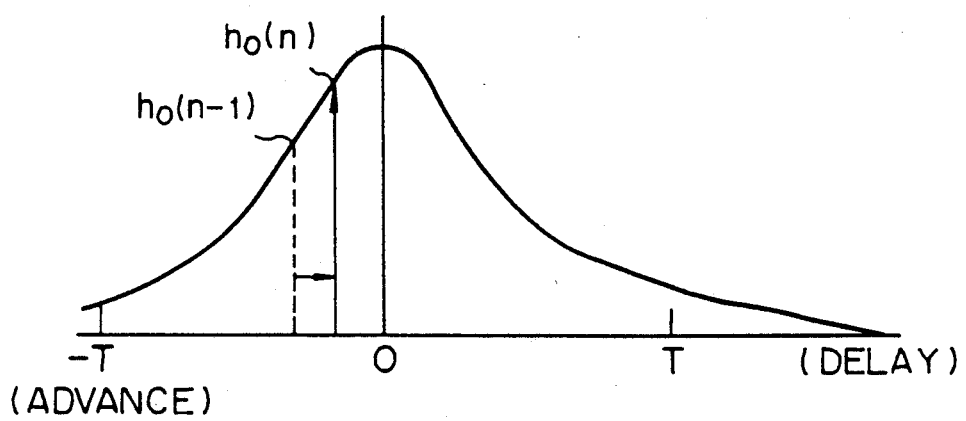
FIGS. 15A and 15B show operations of the third embodiment of the present invention.
Figure 15B:
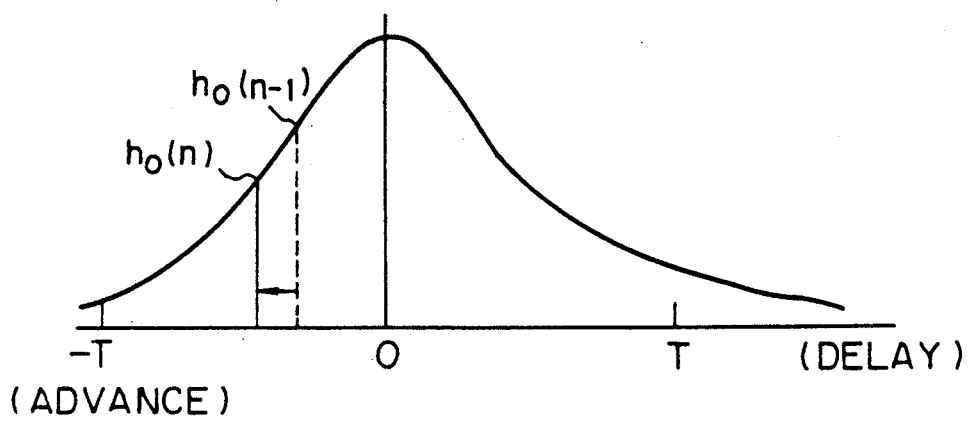

FIGS. 15A and 15B show a principle of the third embodiment of the present invention.

Namely, an impulse response $h_o(n)$ at a phase of a period n of the receiver clock is compared with an impulse response $h_o(n-1)$ at the same phase of a previous period $n-1$ of the receiver clock, and the phase of the receiver clock is shifted in a direction the same as or opposite to the direction in which the phase of the receiver clock was shifted by the previous operation of the comparison and the shifting, according to whether the impulse response $h_o(n)$ at that phase is larger or smaller than the impulse response $h_o(n-1)$ in the previous period.

Preferably, in the embodiment of FIG. 14, the outputs $h_o$ of the impulse response calculation circuit 32 are averaged for a predetermined number of periods in an average circuit comprising the adder 82 and the register 83 to generate an averaged impulse response value $<h_o(n)>$, and an averaged impulse response value $<h_o(n-1)>$ for the predetermined number of previous periods is held in the register 84.

The averaged value $<h_o(n)>$ and the averaged value $<h_o(n-1)>$ for the previous periods are compared with each other in the comparator 85. The comparator 85 outputs "1" when the averaged value $<h_o(n)>$ is larger than the averaged value $<_o(n-1)>$, or outputs "0" when the averaged value $<h_o(n)>$ is smaller than the averaged value $<h_o(n-1)>$. The output of the comparator 85 is held in the register 86.

When the averaged value $<h_o(n)>$ of the impulse responses $h_o(n)$ for the predetermined number of periods is larger than the averaged value $<h_o(n-1)>$ of the impulse responses $h_o(n-1)$ for the predetermined number of previous periods as shown in FIG. 15A, the same control signal as the preceding control signal for the phase shift of the receiver clock is output. The content of the preceding control signal is held in the register 88, and this content is output through the selector 89 under the control of the output of the register 86.

When the averaged value $<h_o(n)>$ of the impulse responses $h_o(n)$ for the predetermined number of periods is smaller than the averaged value $<h_o(n-1)>$ of the impulse responses $h_o(n-1)$ for the predetermined number of previous periods as shown in FIG. 15B, a control signal opposite to the preceding control signal for the phase shift of the receiver clock is output. Namely, the content of the preceding control signal is output from the register 88 through the inverter 87 and the selector 89 to the decoder 90 under the control of the output of the register 86.

The control signal output from the selector 89 is then transformed to a control signal to advance or delay the phase of the receiver clock, in the decoder 90.

These control signals function the same as the corresponding control signals in the construction of FIGS. 10 and 12, and are applied to the receiver clock generation circuit 60 as shown in FIG. 10, where the aforementioned initial phase generating circuit 36 is not necessary in the third embodiment.

Further, a buffer means 50 as described in FIG. 10 can be provided after the selector 89 instead of the decoder 90, to reduce jitter due to fluctuations of the impulse response.

According to the construction of FIG. 14, when the averaged value $<h_o(n)>$ of the impulse responses $h_o(n)$ for the predetermined number of periods is larger than the averaged value $<h_o(n-1)>$ of the impulse responses $h_o(n-1)$ for the predetermined number of previous periods as shown in FIG. 15A, the output of the comparator 85 is "1", and is then held in the register 86.

The output "1" of the register 86 controls the selector 89 to pass the output of the register 88 to the decoder 90, and therefore, a control signal to shift the phase of the receiver clock in the same direction as the preceding control is output, i.e., if the preceding control corresponds to a delay, and then, the following control is also a delay.

When controls of delays are repeated, the phase of the receiver clock shifts beyond the peak of the impulse response after the repetition of delays, i.e., the averaged value $<h_o(n+1)>$ of the impulse responses $h_o(n+1)$ for the predetermined number of periods becomes smaller than the averaged value $<h_o(n)>$ of the impulse responses $h_o(n)$ for the predetermined number of previous periods. Therefore, the output of the comparator 85 becomes "0", and the content the register 88 is output through the inverter 87 and the selector 89 as a control signal to advance the phase of the receiver clock.

Similarly, after controls of advances, a control signal for a delay will appear. Thus, the phase of the receiver clock is controlled to be near the peak of the impulse response according to the third embodiment of the present invention.

In addition, according to the average circuit, the phase of the receiver clock will not be shifted by a fluctuation of the calculated value $h_o$ of the impulse response, which may be affected by a noise superimposed on the received data signal $x(t)$.

The above-mentioned predetermined number of periods for averaging can be also, for example, sixty, and T60, T60', and T60" each denote a 1/60 frequency-divided clock generated from the receiver clock, each has a period sixty times that of the receiver clock, and there is a relationship among the individual phases, where T60<T60'<T60", and all of these clocks are generated in the timing generation circuit 91 similar to the corresponding circuit in FIG. 12.

Figure 16:
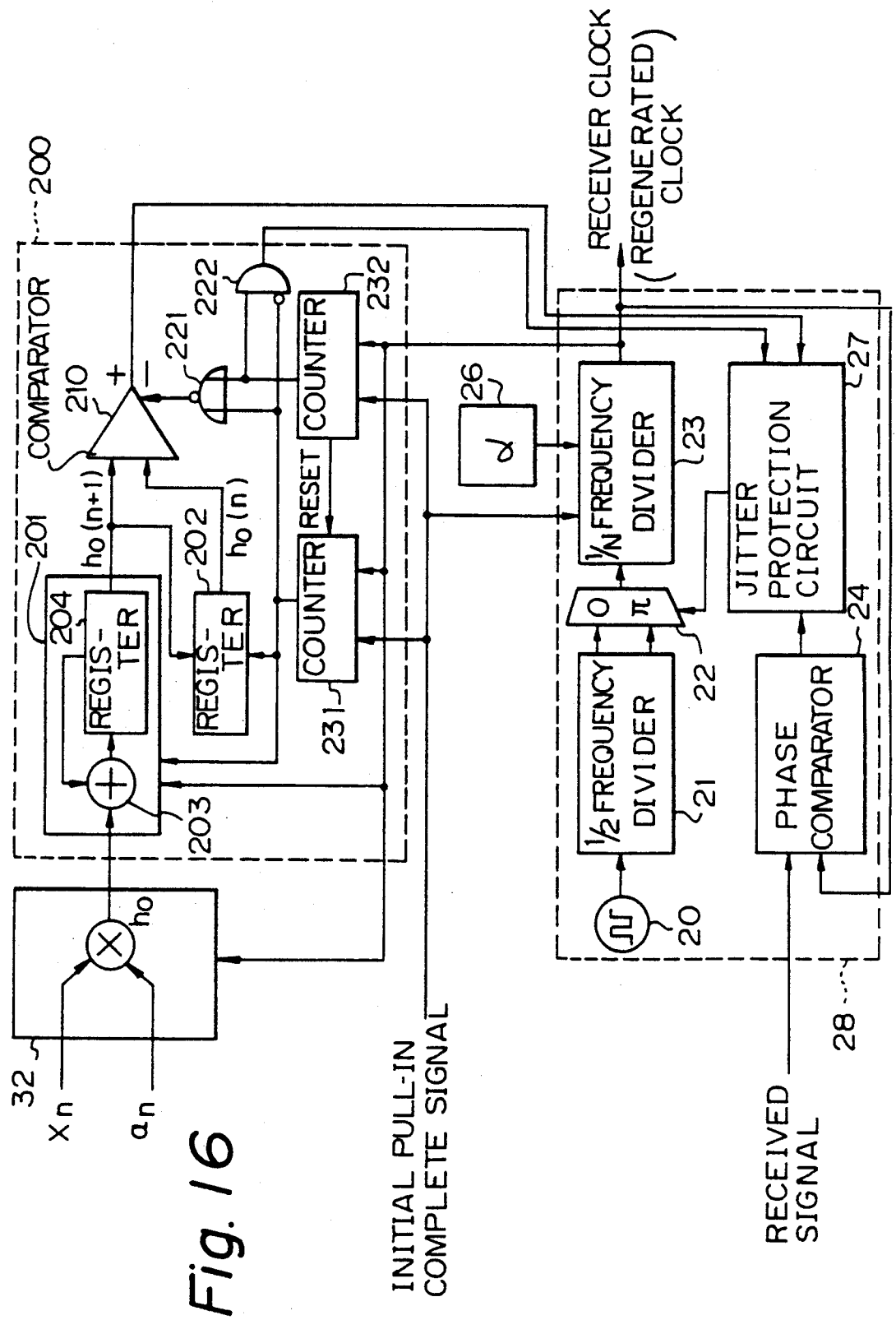
FIG. 16 shows a part of the construction of a timing regeneration circuit as a fourth embodiment of the present invention.

FIG. 16 shows the construction of the fourth embodiment of the present invention.

In FIG. 16, reference numeral 32 denotes an impulse response calculation circuit, 200 denotes a control circuit, 28 denotes a digital phase-lock loop (DPLL) circuit, 26 denotes an initial phase generating circuit, 201 denotes an averaging circuit, 203 denotes an adder, 202 and 204 each denote a register, 210 denotes a comparator, 221 denotes an NOR gate, 222 denotes an AND gate, 231 and 232 each denote a counter, 20 denotes a master oscillator, 21 denotes a ½ frequency divider, 22 denotes a selector, 23 denotes a 1/N frequency divider, 24 denotes a phase comparator, and 27 denotes a jitter protection counter.

In FIG. 16, the basic construction consisting of the sampling circuit (not shown), the data symbol discrimination circuit (not shown), the impulse response calculation circuit 32, the averaging circuit 201, the register 202, and the comparator 210 are the same as the corresponding constructions in FIGS. 14.

The counters 231 and 232, the NOR gate 221, and the AND gate 222 constitute a timing generation circuit.

In addition, the construction of the DPLL circuit shown in FIG. 16 is similar to the construction of FIG. 2, except the additional construction explained later with reference to FIG. 17.

Similar to FIG. 8, the initial phase setting circuit 26 advances the reference phase by a predetermined phase difference from the value of the reference phase just after an initial pull-in operation.

Figure 18:
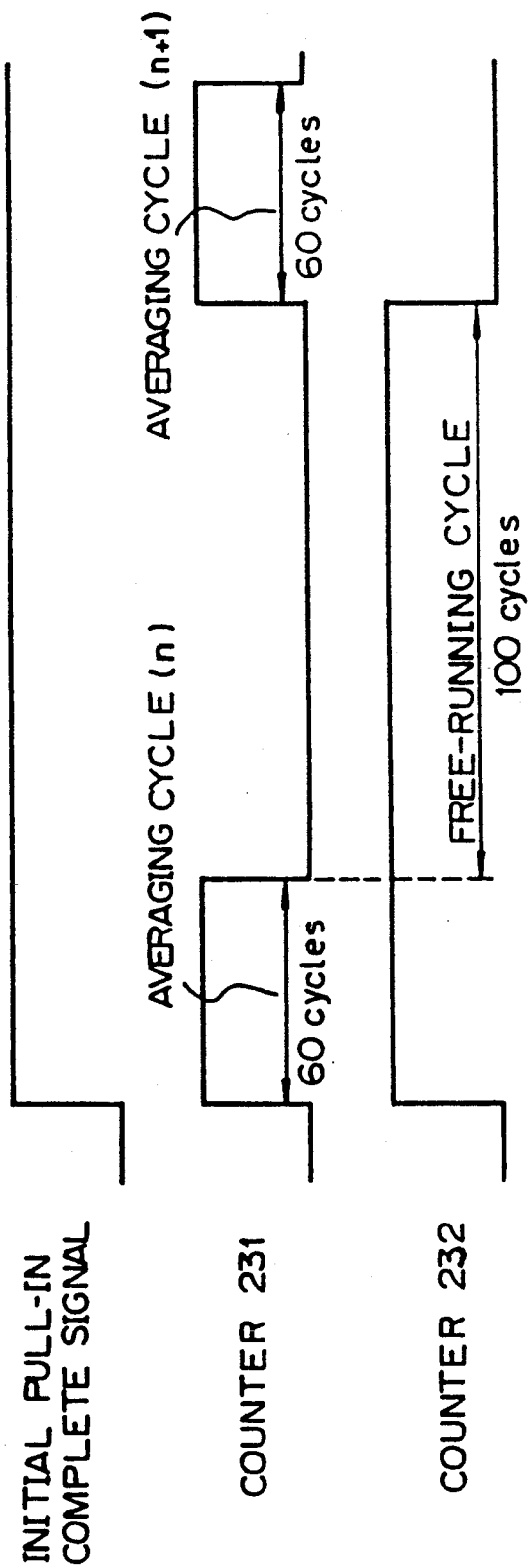
FIG. 18 shows a timing of the operation of the counters 231 and 232 in the construction of FIG. 16.

The sampling in the sampling circuit and the determination in the data symbol discrimination circuit (not shown), are carried out at the phase of the leading edge of the receiver clock for the averaging cycles shown in FIG. 18, and the impulse response calculation circuit 72 calculates the impulse response $h_o$ at the phase of the leading edge of the receiver clock for the same averaging cycles.

Figure 19A:
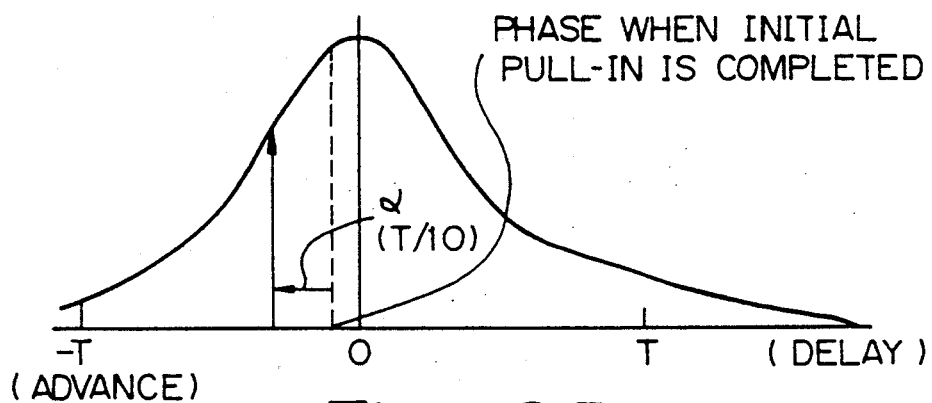
FIGS. 19A, 19B, and 19C show operations of the fourth embodiment of the present invention.
Figure 19B:
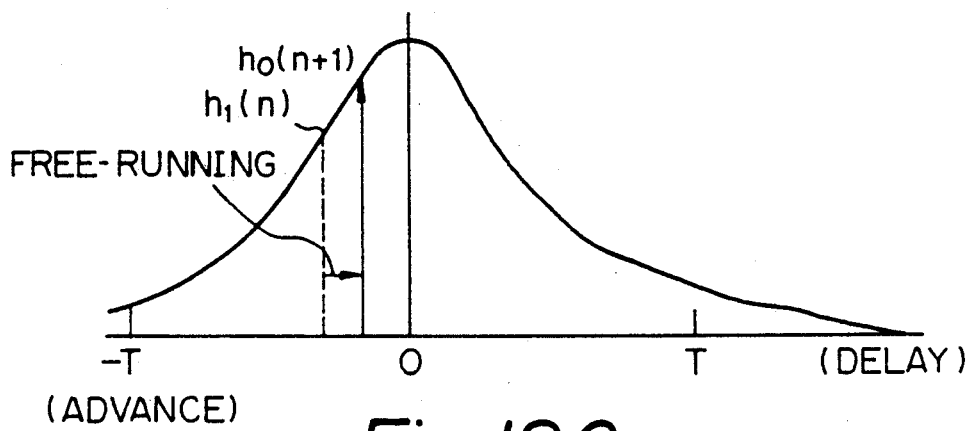
Figure 19C:
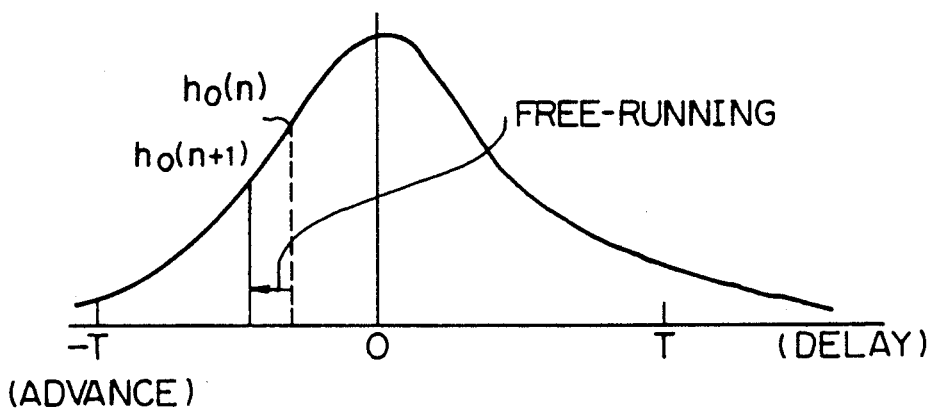

FIGS. 19A, 19B, and 19C show an example of an operation of the fourth embodiment of the present invention.

First, the initial phase setting circuit 26 advances the reference phase by a predetermined phase difference from the value of the reference phase just after an initial pull-in operation.

An impulse response $h_o(n+1)$ at a phase of a period $n+1$ of the receiver clock is compared with an impulse response $h_o(n)$ at the same phase of a previous period n of the receiver clock, and then the phase of the receiver clock is promoted to be advanced or delayed according to whether the impulse response $h_o(n+1)$ is larger or smaller than the impulse response $h_o(n)$.

Preferably, in the embodiment of FIG. 16, the output $h_o$ of the impulse response calculation circuit 32 is averaged for a predetermined number of periods in an average circuit 201 comprising the adder 203 and the register 204 to generate an averaged impulse response value $<h_o(n+1)>$, and an averaged impulse response value $<h_o(n)>$ for the predetermined number of previous periods is held in the register 202.

More preferably, a free-running cycle is provided between the above two averaging cycles as shown in FIG. 18.

The averaged value $<h_o(n+1)>$ and the averaged value $<h_o(n)>$ for the previous periods are compared with each other in the comparator 210. The comparator 210 outputs "1" when the averaged value $<h_0(n+1)>$ is larger than the averaged value $<h_0(n)>$, or outputs "0" when the averaged value $<h_0(n+1)>$ is smaller than the averaged value $<h_0(n)>$. The output of the comparator 210 is held.

When, initially, the phase of the receiver clock has been advanced by $\alpha$, if the averaged value $<h_0(n+1)>$ of the impulse responses $h_0(n+1)$ for the predetermined number of periods is larger than the averaged value $<h_0(n)>$ of the impulse responses $h_0(n)$ for the predetermined number of previous periods as shown in FIG. 19B, the phase of the receiver clock is promoted to be advanced, or if the averaged value $<h_0(n+1)>$ of the impulse responses $h_0(n+1)$ for the predetermined number of periods is smaller than the averaged value $<h_0(n)>$ of the impulse responses $h_0(n)$ for the predetermined number of previous periods as shown in FIG. 19C, the phase of the receiver clock is promoted to be delayed.

The timing controls of the averaging cycles and the free-running cycle are carried out as shown in FIG. 18.

When receiving an initial pull-in completion signal, both the counters 231 and 232 begin to count the receiver clock generated in the DPLL circuit 28, where the output of each counter is active ("1") while counting a preset number, 60 for the counter 231 and 160 for the counter 232, in this example.

While receiving an active output of the counter 231, the averaging circuit 201 calculates an average $<h_0(n)>$ of the impulse responses $h_0(n)$ at the leading edges of the receiver clock. When the output of the counter 231 becomes inactive, the calculated average in the average circuit 201 is written in the register 202, the register 204 is cleared, and the output of the AND gate 222, which receives the output of the counter 231 at an inverted input terminal and the output of the counter 232 at the other non-inverted input terminal, becomes active.

The output of the AND gate 222 is applied to the jitter protection circuit 27. While the output of the AND gate 222 is active, the jitter protection circuit 27 stops.

When the counter 232 completes the counting of the preset number, the output of the counter 232 becomes inactive. When the output of the counter 232 becomes inactive, the counter 231 is reset, and then the output of the counter 231 becomes active again, i.e., the calculation of another average $<h_0(n+1)>$ of the impulse responses $h_0(n+1)$ at the leading edges of the receiver clock, begins.

When the counter 231 completes the counting of the preset number again, the output of the AND gate 222 becomes inactive, and the inverted output of the NOR gate 221, which receives both the outputs of the counters 231 and 232, becomes active.

The active output of the NOR gate 221 allows the output of the comparator 210 to be applied to the jitter protection circuit 27.

The output of the comparator 210 promotes an advance or a delay of the phase of the receiver clock according to whether the average $<h_0(n+1)>$ is larger or smaller than the average $<h_0(n)>$, if, initially, the phase of the receiver clock has been advanced by $\alpha$, or the output of the comparator 210 promotes an advance or a delay of the phase of the receiver clock according to whether the average $<h_0(n+1)>$ is smaller or larger than the average $<h_0(n)>$ if, initially, the phase of the receiver clock has been delayed by $\alpha$.

The promotion in this example is realized by a resetting of a number of protection steps in the jitter protection circuit 27.

As explained before with reference to FIG. 2, the jitter protection circuit 27 is, for example, made by an up/down counter, and increments or decrements its count according to whether receiving an up signal or a down signal from the phase comparator 24. In the up/down counter, a maximum and a minimum counts are preset, a value between the maximum and minimum counts is set as the initial count, and an underflow output of the up/down counter is a control signal to advance the phase of the output clock of the DPLL circuit, and a control signal to delay the phase of the output clock is an overflow output of the up/down counter.

The difference between the initial count and the minimum count realizes a protection step in the advance side, and the difference between the maximum count and the initial count realizes a protection step in the delay side.

Thus, the promotion to advance the phase of the receiver clock is carried out by decreasing the protection steps in the advance side and increasing the protection steps in the delay side, and the promotion to delay the phase of the receiver clock is carried out by decreasing the protection steps in the delay side and increasing the protection steps in the advance side.

Figure 17:
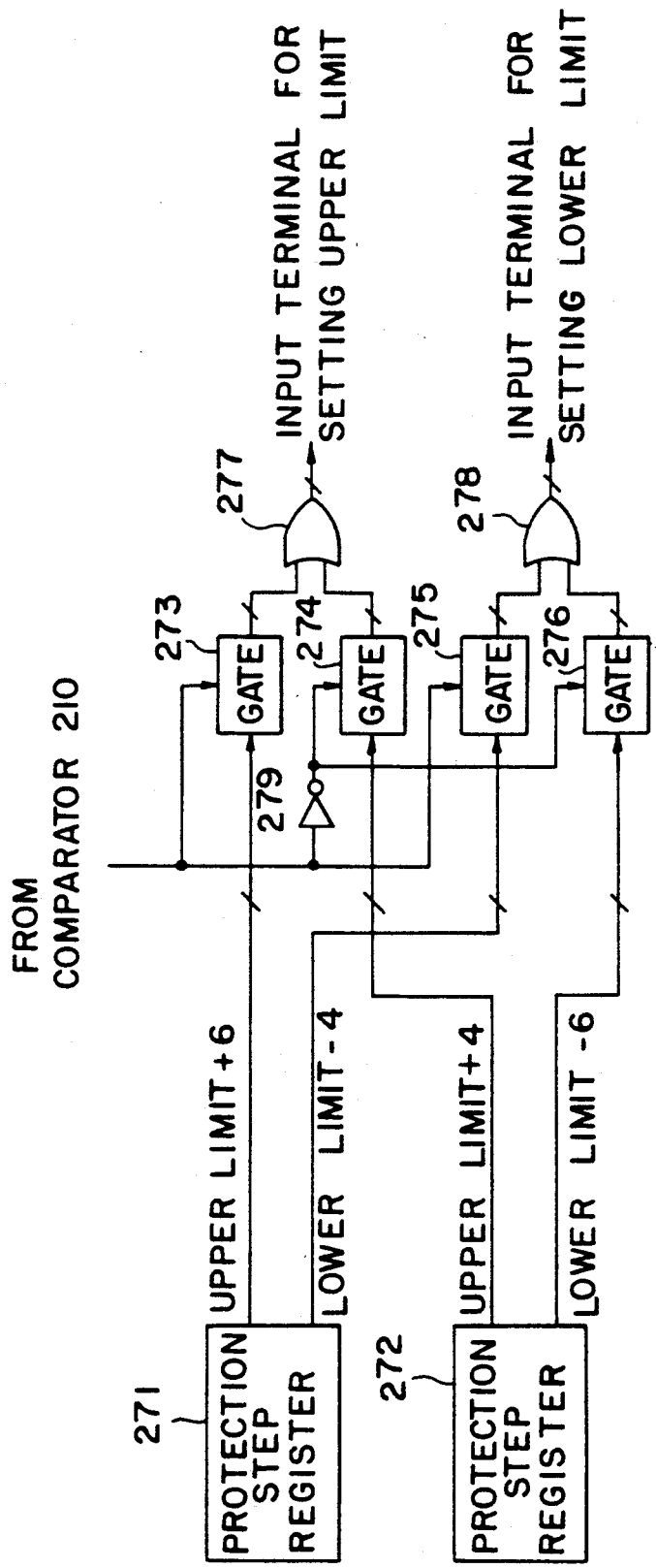
FIG. 17 shows a detailed construction for setting protection steps in the jitter protection circuit 27 of FIG. 16.

The construction for carrying out the above resetting of the number of protection steps in the jitter protection circuit 27, which is provided in the jitter protection circuit 27, is shown in FIG. 17.

In FIG. 17, reference numerals 271 and 272 each denote a protection step register, 273 to 276 each denote a gate, 277 and 278 each denote an OR circuit, and 279 denotes an inverter.

The protection step registers 271 and 272 each hold an individual set of numbers of the protection steps in the advance side and the delay side, where the set of numbers held in the register 271 is for promoting to advance the phase of the output clock, and the set of numbers held in the register 272 is for promoting to delay the phase of the output clock.

When an output "1" is applied to the construction of FIG. 17, the gates 273 and 275 are open, and the set of numbers for promoting to advance the phase of the output clock, is output through the above gates 273 and 275 and the OR gates 277 and 278 to the input terminals for setting the upper limit and the lower limit in the up/down counter.

When an output "0" is applied to the construction of FIG. 17, the gates 274 and 276 are open, and the set of numbers for promoting to delay the phase of the output clock, is output through the above gates 274 and 276 and the OR gates 277 and 278 to the input terminals for setting the upper limit and the lower limit.

The above construction of FIG. 17 can be used when, initially, the phase of the receiver clock has been advanced by $\alpha$. If, initially, the phase of the receiver clock has been delayed by $\alpha$, the output of the comparator 210 must be inverted before being applied to the construction of FIG. 17.

The 1/N frequency divider 23 is realized by a counter. The advancing or delaying of the initial phase by $\alpha$, is carried out by setting the output of the initial phase generation circuit 26 as an initial count of the counter realizing the 1/N frequency divider 23 when receiving the initial pull-in complete signal, wherein the initial pull-in complete signal is used as a load signal of the counter.

The above-mentioned operation of promoting the advance or delay of the phase of the receiver clock by resetting a number of the protection steps in the jitter protection circuit can be applied to the constructions of the first to third embodiments of the present invention.

The operation of promoting the advance or delay of the phase of the receiver clock is carried out by resetting the upper limit and lower limit in the up/down counter 52 in FIG. 10, which realizes the buffer means 50, using the construction of FIG. 17, in the first embodiment.

Further, as mentioned before, the buffer means 50 shown in FIG. 10 can also be used in the second and third embodiments. Therefore, the above operation of promoting the advance or delay of the phase of the receiver clock can be used in these embodiments.

The tendency of the difference of the frequencies between the receiver clock and the receiving signal can be detected as an output of the comparator 210 in FIG. 16, and then the upper limit in the buffer means 50 can be lowered and the lower limit can be made higher when the tendency of a delay in the receiver clock is detected, and the upper limit can be made higher and the lower limit can be lowered when a tendency of an advance in the receiver clock is detected.

Preferably, the operation of promoting the advance or delay of the phase of the receiver clock is carried out in the stage after the completion of the initial pull-in operation, and before the operations of searching and keeping a phase corresponding to the peak of the impulse response according to one of the first to third embodiments of the present invention.

The fifth embodiment of the present invention is a circuit for obtaining accurate timing information from a received data signal, which is particularly useful in the initial pull-in operation.

In the prior art, the initial pull-in operation is carried out by the phase-lock loop circuit, where a long time is necessary until the receiver clock converges to the timing of the receiving data signal.

Hereinafter, through the explanation of the fifth embodiment of the present invention, it is shown that the technique of the present invention is applicable for remarkably reducing the converging time in the initial pull-in operation.

Figure 20:
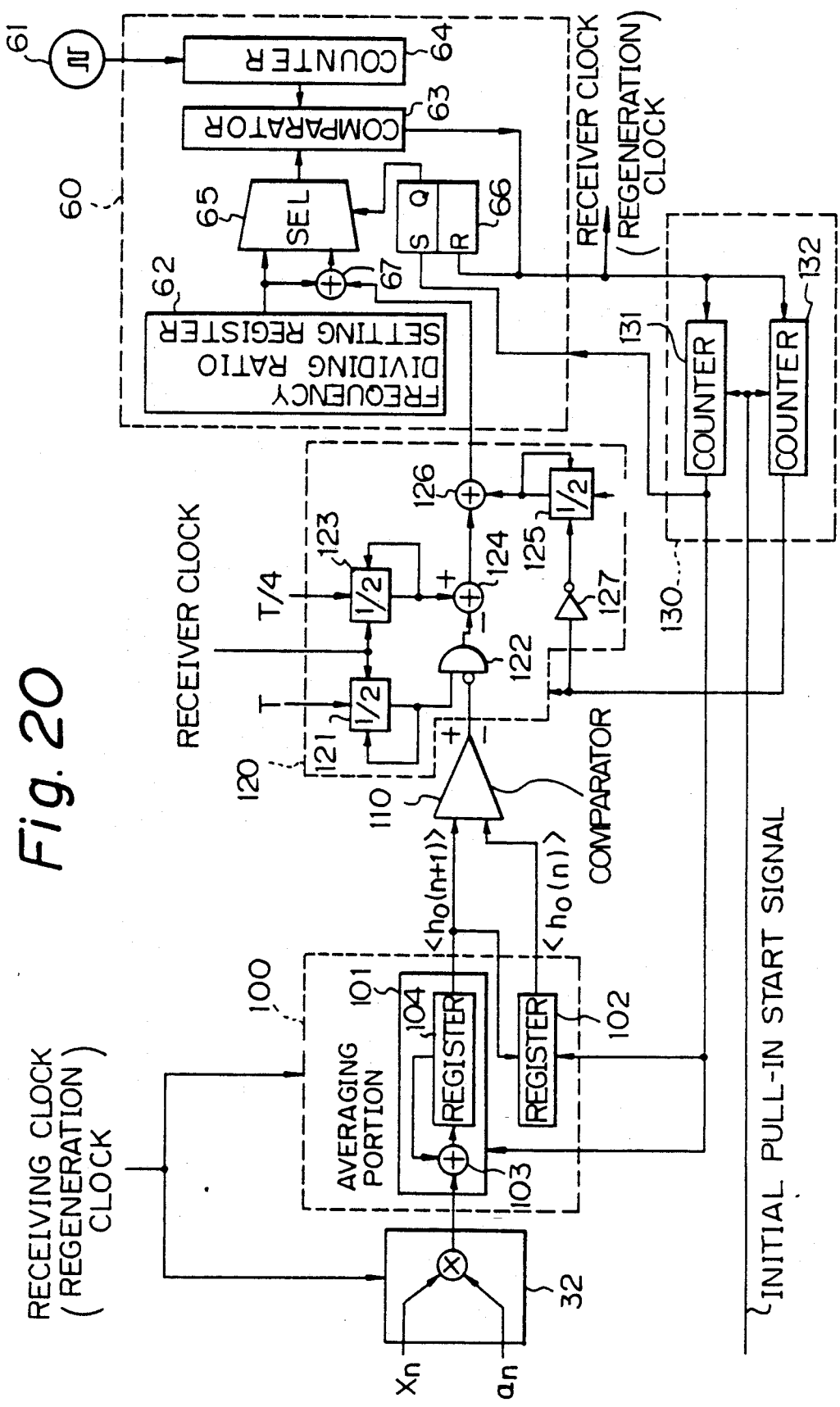
FIG. 20 shows a part of the construction of a timing regeneration circuit as a fifth embodiment of the present invention.

FIG. 20 shows the construction of the fifth embodiment of the present invention.

In FIG. 20, reference numeral 32 denotes an impulse response calculation circuit, 100 denotes an averaging portion, 120 denotes a phase control portion, 130 denotes a timing control portion, 60 denotes a receiver clock generation circuit, 61 denotes a master oscillator, 101 denotes an average circuit, 102 and 104 each denote a register, 103, 124, and 126 each denote an adder, 121, 123, and 125 each denote a phase generating circuit, 122 denotes a gate circuit, 127 denotes an inverter, and 131 and 132 each denote a counter.

The basic functions of the impulse response calculation circuit 32, the average circuit 101, the register 102 which holds the calculated value of the average circuit 101, and the comparator 110 are the same as the corresponding construction in FIG. 16. And the receiver clock generation circuit 60 in FIG. 20 is the same as the corresponding one in FIG. 10, except the circuit 60 in FIG. 20 has an adder 67, and the sum of the output of the frequency dividing ratio setting register 62 and the output of the phase control portion 120 is applied to one of the input terminals of the selector 65 instead of the output of the initial phase generation circuit 36.

Figure 21:
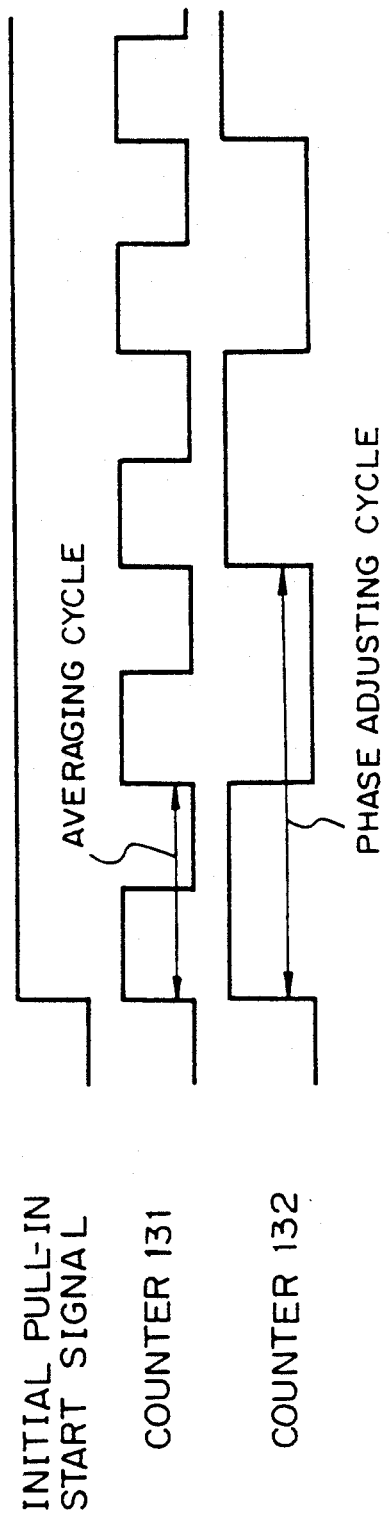
FIG. 21 shows a timing of the operation of the counters 231 and 232 in the construction of FIG. 16.

The sampling in the sampling circuit and the determination in the data symbol discrimination circuit (not shown), are carried out at the phase of the leading edge of the receiver clock for the averaging cycles shown in FIG. 21, and the impulse response calculation circuit 100 calculates the impulse response $h_o$ at the phase of the leading edge of the receiver clock for the same averaging cycles.

Figure 22A:
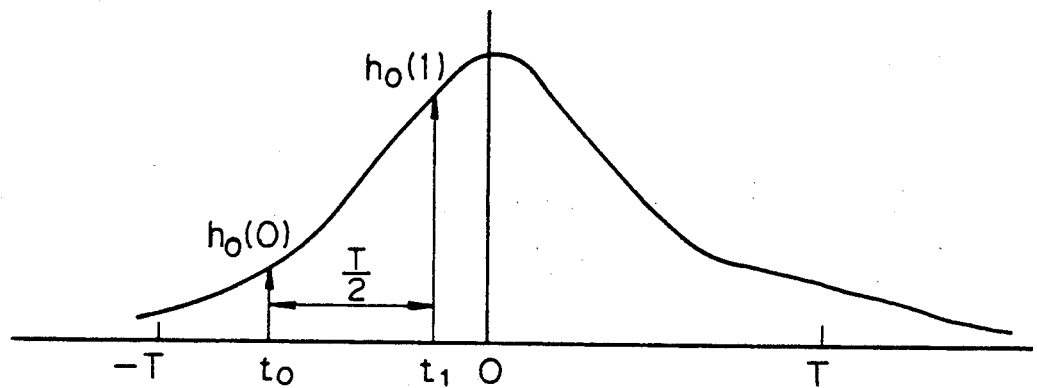
FIGS. 22A, 22B, and 22C show an operation of the fifth embodiment of the present invention.
Figure 22B:
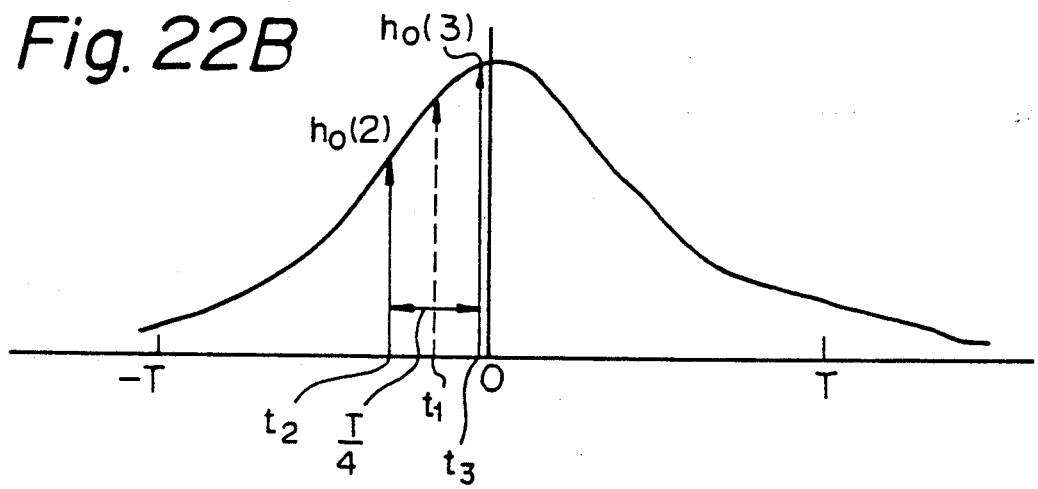
Figure 22C:
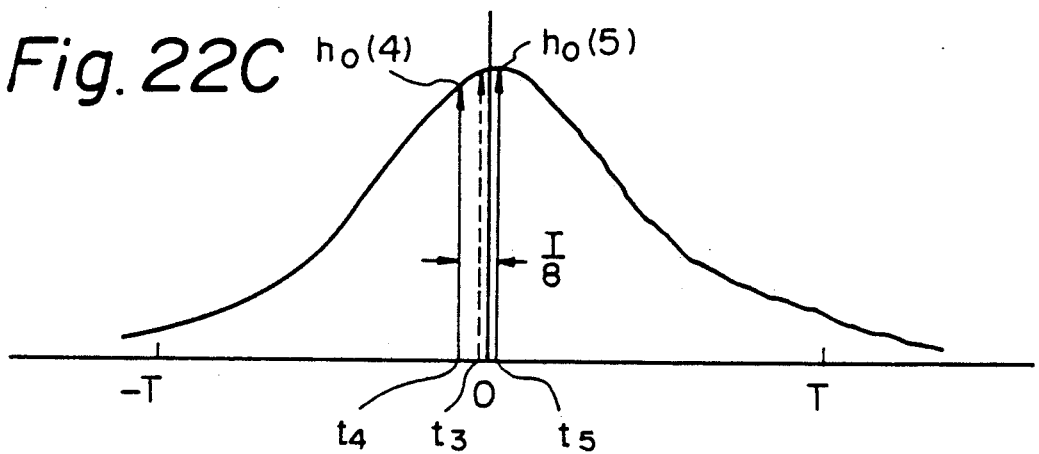

FIGS. 22A, 22B, and 22C show an example of the operation of the fifth embodiment of the present invention.

Since the phase of the receiver clock is independent of the phase of the transmitter clock before beginning an initial pull-in operation, the phase difference between the phase corresponding to the peak of the impulse response and the phase of the leading edge of the receiver clock is arbitrary. In the example of FIG. 22A, the initial phase of the leading edge of the receiver clock before beginning an initial pull-in operation, is denoted by t0.

As a first step, the impulse response $h_o(0)$ at the above initial phase t0 is obtained.

As a second step, the phase of the receiver clock is shifted to a predetermined value, for example, T/2, where T is a period of the receiver clock, and the impulse response $h_o(1)$ at the shifted phase t1 is obtained, where $t1 = t0 + T/2$.

As a third step, the above two impulse responses are compared with each other, and one of the phases of the impulse response at which one phase is larger than the other, is selected as a reference phase. In the example of FIG. 22A, t1 is selected as a reference phase because the impulse response $h_o(1)$ is larger than $h_o(0)$.

As a fourth step, a first phase which is determined by subtracting a predetermined phase difference value from the value of the reference phase, and a second phase which is determined by adding the predetermined phase difference value to the value of the reference phase, are generated. In the example of FIG. 22B, the above predetermined phase difference value is T/8, the first phase is denoted by t2, and the second phase is denoted by t3.

As a fifth step, the impulse response $h_o(2)$ at the first phase t2 and the impulse response $h_o(3)$ at the second phase are compared with each other, and the reference phase of the receiver clock is shifted to one of the first and second phases the impulse response at which is larger than the other. In the example of FIG. 22B, t3 is selected as a new reference phase because the impulse response $h_o(3)$ is larger than $h_o(2)$.

As a sixth step, the above phase difference value is decreased. In the example of FIG. 22C, this value is decreased to T/16.

After the above steps, the above fourth to the sixth steps are repeated until satisfactory convergence is obtained.

To carry out the above process in the construction of FIG. 20, the counters 131 and 132 operate as shown in FIG. 21.

The counters 131 and 132 each operate as a frequency dividing circuit, which divides the frequency of the receiver clock which is generated in the receiver clock generation circuit 60. The ratio of the frequency dividing in the counter 132 is twice the ratio of the frequency division in the counter 131. The period of the output of the counter 131 determines an averaging cycle in the average circuit 101, and the period of the output of the counter 132 determines a phase adjusting cycle in the phase control portion 120.

When receiving an initial pull-in start signal, both the counters 131 and 132 begin to count leading edges of the receiver clock, and simultaneously, the outputs of both the counters 131 and 132 rises.

When the output of the counter 131 rises, the content of the register 102 is renewed by the output of the register 104, and then, the register 104 is cleared and the average circuit 101 begins to calculate an average of the impulse response $h_0(n)$ to obtain the average $<h_0(n)>$. The averaging is carried out for each period of the output of the counter 131.

The initial value T, T/4, and T are each preset in the phase generators 121, 123, and 125, respectively, and the output of each phase generator is divided by two every time it is triggered by a rising of a clock.

When an odd-numbered period of the averaging cycles ends, the output of the counter 132 falls. This falling triggers an output of a phase shift value T/2 ($=T \times \frac{1}{2}$) from the phase generator 125, through the inverter 127. This output is input into the adder 126, and then shifts the output value of the phase control portion 120 by the output value of the phase generator 125. The output of the phase control portion 120 is applied to one input terminal of the adder 67, the sum of the output of the phase control portion 120 and the output of the frequency dividing ratio setting register 62 is obtained by the adder 67, and then the sum, which corresponds to a shifted phase, is applied through the selector 65 to the comparator 63 as a reference value for the comparison. The RS flip-flop circuit 66 is in the set state from the rising time of the output of the counter 131 to the first rising time of the receiver clock after the rising time of the output of the counter 131, and the output of the RS flip-flop circuit 66 makes the selector 65 select the above output.

When the output of the counter 131 rises, only the output of the phase generator 125 contributes to the output of the phase control portion 120, and therefore, the rising time of the output of the comparator 63, i.e., the phase of the receiver clock, is shifted by the value equal to the output of the phase generator 125. Thus, for example, the phase shift from t0 to t1 in FIG. 22A, t2 to t3 in FIG. 22B, or t4 to t5 in FIG. 22C, is realized.

On the other hand, the comparator 110 compares the output of the register 104 with the output of the register 102, and makes its output active ("0") when the average $<h_0(n+1)>$ from the register 104 is smaller than the average $<h_0(n)>$ from the register 102.

When the output of the counter 132 rises, the phase generators 121 and 123 are each triggered to output its own phase.

When the comparator 110 outputs "1", the gate 122 is OFF, and therefore, only the output of the phase generator 123, $-T/8$ is output, and is then input into the adder 67 through the adders 124 and 126. Thus, the phase of the receiver clock is shfted by $-T/8$. This realizes, for example, the shift from t1 to t2 shown in FIG. 22B.

When the comparator 110 outputs "0", the gate 122 is ON, and therefore, the output $-T/2$ of the phase generator 121 is applied through the gate 122 to the adder 124. The above output $-T/2$ and the output $-T/8$ of the phase generator 123 are added in the adder 123, and therefore, the total $-5T/8$ is applied to the adder 67. Thus, the phase of the receiver clock is shifted by $-5T/8$.

At the next timing of a trigger, each output of the phase generators 121, 123, and 125 is made half of the above output, as mentioned before. However, the phase shift operations similar to the above are repeated until the reference phase of the receiver clock falls within a required phase difference from a phase corresponding to a maximum value of the impulse response.

Thus, according to the fifth embodiment of the present invention, the phase of the receiver clock can converge to the timing of the receiving clock with a few long strides, i.e., can converge rapidly, compared with converging with a lot of short strides as in the prior art.

We claim:

1. A circuit for obtaining accurate timing information from a received signal, comprising:
   impulse response obtaining means for obtaining an impulse response from the received signal by sampling the received signal at a sampling phase which is determined by a reference phase of a receiver clock;
   initial pull-in means for temporarily extracting a provisional timing signal from the received signal as an initial phase of said reference phase;
   initial phase setting means for advancing said initial phase of said reference phase by a predetermined phase difference just after the operation of said initial pull-in means;
   previous impulse response register means for holding an impulse response at said sampling phase in a previous period of said receiver clock, as a reference level; and
   comparator means for comparing said impulse response at said sampling phase with said reference level.

2. A circuit according to claim 1, further comprising:
   free-running control means for providing a predetermined length of a free-running cycle after said previous period and before obtaining said impulse response which is to be compared with the reference level.

3. A circuit according to claim 1, wherein:
   said comparator means compares said impulse response at said sampling phase with said reference level and promotes the advance or delay of said reference phase of said receiver clock according to whether said impulse response at said sampling phase is larger or smaller than said reference level.

4. A circuit according to claim 1, wherein:
   said comparator means for comparing said impulse response at said sampling phase with said reference level and promotes the advance or delay of said reference phase of said receiver clock according to whether said impulse response at said sampling phase is smaller or larger than said reference level.

5. A circuit for obtaining accurate timing information from a received signal, comprising:
   impulse response obtaining means for obtaining an impulse response from the received signal by sampling the received signal at a sampling phase which is determined by a reference phase of a receiver clock;
   initial pull-in means for temporarily extracting a provisional timing signal from the received signal as an initial phase of said reference phase;

initial phase setting means for delaying said initial phase of said reference phase by a predetermined phase difference just after the operation of said initial pull-in means;

previous impulse response register means for holding an impulse response at said sampling phase in a previous period of said receiver clock, as a reference level; and comparator means for comparing said impulse response at said sampling phase with said reference level.

6. A circuit according to claim 5, further comprising:

free-running control means for providing a predetermined length of a free-running cycle after said previous period and before obtaining said impulse response which is to be compared with the reference level.

7. A circuit for obtaining accurate timing information from a received signal, comprising:

impulse response obtaining means for obtaining an impulse response from the received signal by sampling the received signal at a sampling phase which is determined by a reference phase of a receiver clock;

initial pull-in means for temporarily extracting a provisional timing signal from the received signal as an initial phase of said reference phase;

initial phase setting means for advancing said initial phase of said reference phase by a predetermined phase difference just after the operation of said initial pull-in means;

average obtaining means for obtaining an average value of impulse responses at the timings corresponding to said sampling phase for a predetermined number of periods of said receiver clock;

previous impulse response register means for holding an average value of the impulse responses at said sampling phase for a predetermined number of previous periods of said receiver clock, as a reference level; and comparator means for comparing said average value of the impulse responses at said sampling phase with said reference level and for promoting the advance or delay of said reference phase of said receiver clock according to whether said average value of the impulse responses at said sampling phase is larger or smaller than said reference level.

8. A circuit for obtaining accurate timing information from a received signal, comprising:

impulse response obtaining means for obtaining an impulse response from the received signal by sampling the received signal at a sampling phase which is determined by a reference phase of a receiver clock;

initial pull-in means for temporarily extracting a provisional timing signal from the received signal as an initial phase of said reference phase;

initial phase setting means for delaying said initial phase of said reference phase by a predetermined phase difference just after the operation of said initial pull-in means;

average obtaining means for obtaining an average value of impulse responses at the timings corresponding to said sampling phase for a predetermined number of periods of said receiver clock;

previous impulse response register means for holding an average value of the impulse responses at said sampling phase for a predetermined number of previous periods of said receiver clock, as a reference level; and comparator means for comparing said average value of the impulse responses at said sampling phase with said reference level and for promoting the advance or delay of said reference phase of said receiver clock according to whether said average value of the impulse responses at said sampling phase is smaller or larger than said reference level.

9. A circuit for obtaining accurate timing information from a received signal, comprising:

impulse response obtaining means for obtaining an impulse response from the received signal by sampling the received signal at a sampling phase which is determined by a reference phase of a receiver clock;

initial pull-in means for temporarily extracting a provisional timing signal from the received signal as an initial phase of said reference phase;

initial phase setting means for advancing said initial phase of said reference phase by a predetermined phase difference just after the operation of said initial pull-in means;

previous impulse response register means for holding an impulse response at said sampling phase in a previous period of said receiver clock, as a reference level;

comparator means for comparing said impulse response at said sampling phase with said reference level;

receiver clock generating means for generating said receiver clock which is synchronized with the received signal, comprising:

phase difference detecting means for detecting a difference between a timing of said receiver clock with timing information obtained from the received signal, accumulating means for accumulating results of the detection, and phase shifting means for shifting said reference phase of said receiver clock according to whether the accumulation exceeds an upper limit or a lower limit; and wherein said comparator means includes means for lowering said upper limit and for raising said lower limit when said impulse response at said sampling phase is larger than said reference level and for raising said upper limit and for lowering said lower limit when said impulse response at said reference phase is smaller than said reference level.

10. A circuit for obtaining accurate timing information from a received signal, comprising:

impulse response obtaining means for obtaining an impulse response from the received signal by sampling the received signal at a sampling phase which is determined by a reference phase of a receiver clock;

initial pull-in means for temporarily extracting a provisional timing signal from the received signal as an initial phase of said reference phase;

initial phase setting means for delaying said initial phase of said reference phase by a predetermined phase difference just after the operation of said an initial pull-in means;

previous impulse response register means for holding an impulse response at said sampling phase in a previous period of said receiver clock, as a reference level;

comparator means for comparing said impulse response at said sampling phase with said reference level;

receiver clock generating means for generating said receiver clock which is synchronized with the received signal, comprising:

phase difference detecting means for detecting a difference between a timing of said receiver clock with timing information obtained from the received signal, accumulating means for accumulating results of the detection, and phase shifting means for shifting said reference phase of said receiver clock according to a result of individual signals each of which is output when a value corresponding to the accumulation exceeds an upper limit or a lower limit; and wherein said comparator means includes means for lowering said upper limit and for raising said lower limit when said impulse response at said sampling phase is smaller than said reference level and for raising said upper limit and for lowering said lower limit when said impulse response at said sampling phase is larger than said reference level.

11. A circuit for obtaining accurate timing information from a received signal, comprising:

impulse response obtaining means for obtaining an impulse response from the received signal by sampling the received signal at a sampling phase which is determined by a reference phase of a receiver clock;

comparator means for comparing said impulse response at said sampling phase with a predetermined reference level, said predetermined reference level is set so near to a maximum value of an overall impulse response that a phase corresponding to said predetermined reference level is within a required phase difference from a phase corresponding to the maximum value; and phase control means for shifting said reference phase toward said phase corresponding to said predetermined reference level.

12. A circuit according to claim 11, further comprising:

initial pull-in means for temporarily extracting a provisional timing signal from the received signal as an initial phase of said reference phase;

initial phase setting means for advancing said initial phase of said reference phase by a predetermined phase difference just after the operation of said initial pull-in means; and wherein said phase control means includes means for advancing or delaying said reference phase according to whether said impulse response at said sampling phase is larger or smaller than said predetermined reference level.

13. A circuit according to claim 12, further comprising buffer means for accumulating outputs of said comparator means, and outputting individual signals when said accumulated value exceeds an upper limit or a lower limit.

14. A circuit according to claim 11, further comprising:

initial pull-in means for temporarily extracting a provisional timing signal from the received signal as an initial phase of said reference phase;

initial phase setting means for delaying said initial phase of said reference phase by a predetermined phase difference just after the operation of said initial pull-in means, and wherein said phase control means includes means for advancing or delaying said reference phase of said receiver clock according to whether said impulse response at said sampling phase is smaller or larger than said predetermined reference level.

15. A circuit according to claim 14, further comprising buffer means for accumulating outputs of said comparator means, and outputting individual signals when the accumulated value exceeds an upper limit or a lower limit.

16. A circuit for obtaining accurate timing information from a received signal, comprising:

first impulse response obtaining means for obtaining an impulse response from the received signal by sampling the received signal at a first phase;

second impulse response obtaining means for obtaining an impulse response from the received signal by sampling the received signal at a second phase;

timing generation means for generating timings corresponding to said first and second phases determined based on a reference phase of a receiver clock, wherein said second phase differs by a predetermined phase difference from said first phase; and comparator means for comparing said impulse responses at said first and second phases, and for advancing or delaying said reference phase of said receiver clock according to whether said impulse response at said first phase is larger or smaller than said impulse response at said second phase so that a phase corresponding to the maximum value of an overall impulse response is near the center of said first and second phases.

17. A circuit according to claim 16, further comprising:

first average obtaining means for obtaining an average value of impulse responses at the timings corresponding to said first phase for a predetermined number of periods of said receiver clock; and second average obtaining means for obtaining an average value of impulse responses at the timings corresponding to said second phase for said predetermined number of periods of said receiver clock; and wherein said comparator means compares said averages of the impulse responses at said first and second phases with each other, and advances or delays said reference phase of said receiver clock according to whether said average of the impulse responses at said first phase is larger or smaller than said average of the impulse responses at said second phase so that a phase corresponding to the maximum value of an overall impulse response is near the center of said first and second phases.

18. A circuit for obtaining accurate timing information from a received signal, comprising:

impulse response obtaining means for obtaining an impulse response from the received signal by sampling the received signal at a sampling phase;

timing generation means for generating a timing corresponding to said sampling phase, based on a reference phase of a receiver clock;

previous impulse response register means for holding an impulse response at said sampling phase in a previous period of said receiver clock; and comparator means for comparing said impulse response at said sampling phase with said impulse response in said previous period, and for shifting said reference phase of said receiver clock in a direction the same as or opposite to the direction in which the reference phase of said receiver clock was shifted by a previous operation of said comparator means, according to whether said impulse response at said sampling phase is larger or smaller than said impulse response in said previous period.

19. A circuit for obtaining accurate timing information from a received signal, comprising:
impulse response obtaining means for obtaining an impulse response from the received signal by sampling the received signal at a sampling phase;
timing generation means for generating a timing corresponding to said sampling phase, based on a reference phase of a receiver clock;
average obtaining means for obtaining an average value of impulse responses at the timings corresponding to said sampling phase for a predetermined number of periods of said receiver clock;
previous impulse response register means for holding an average value of impulse responses at the timings corresponding to said sampling phase for said predetermined number of previous periods of said receiver clock; and
comparator means for comparing said average value of the impulse responses corresponding to said sampling phase with said average value of the impulse responses in said previous periods, and for shifting said reference phase of said receiver clock in a direction the same as or opposite to the direction in which the reference phase of said receiver clock was shifted by a previous operation of said comparator means, according to whether said average value of the impulse responses corresponding to said sampling phase is larger or smaller than said average value of the impulse responses in said previous period.

20. A circuit for obtaining accurate timing information from a received signal, comprising:
impulse response obtaining means for obtaining an impulse response from the received signal by sampling the received signal at a sampling phase which is determined by a reference phase of a receiver clock;
initial pull-in means for temporarily extracting a provisional timing signal from the received signal as an initial phase of said reference phase;
initial phase setting means for advancing said initial phase of said reference phase by a predetermined phase difference just after the operation of said initial pull-in means;
previous impulse response register means for holding an impulse response at said sampling phase in a previous period of said receiver clock, as a first reference level; and
first comparator means for comparing said impulse response at said sampling phase with said first reference level;
second comparator means for comparing said impulse response at said sampling phase with a predetermined reference level, where said predetermined reference level is set so near to a maximum value of an overall impulse response that a phase corresponding to said predetermined reference level is within a required phase difference from a phase corresponding to the maximum value, and said second comparator means includes means for advancing or delaying said reference phase according to whether said impulse response at said sampling phase is larger or smaller than said predetermined reference level; and
buffer means for accumulating outputs of said second comparator means and outputting individual signals when the accumulated value exceeds an upper limit or a lower limit; and wherein
said first comparator means includes means for lowering said upper limit and for raising said lower limit when said impulse response at said sampling phase is larger than said first reference level and for raising said upper limit and for lowering said lower limit when said impulse response at said sampling phase is smaller than said first reference level.

21. A circuit for obtaining accurate timing information from a received signal, comprising:
impulse response obtaining means for obtaining an impulse response from the received signal by sampling the received signal at a sampling phase which is determined by a reference phase of a receiver clock;
initial pull-in means for temporarily extracting a provisional timing signal from the received signal as an initial phase of said reference phase;
initial phase setting means for delaying said initial phase of said reference phase by a predetermined phase difference just after the operation of said initial pull-in means;
previous impulse response register means for holding an impulse response at said sampling phase in a previous period of said receiver clock, as a first reference level; and
previous impulse response register means for holding an impulse response at said sampling phase in a previous period of said receiver clock, as a first reference level; and
first comparator means for comparing said impulse response at said sampling phase with said first reference level;
second comparator means for comparing said impulse response at said sampling phase with a predetermined reference level, where said predetermined reference level is set so near to a maximum value of an overall impulse response that a phase corresponding to said predetermined reference level is within a required phase difference from a phase corresponding to the maximum value, and said second comparator means includes means for advancing or delaying said reference phase according to whether said impulse response at said sampling phase is smaller or larger than said predetermined reference level;
buffer means for accumulating outputs of said second comparator means and outputting individual signals when the accumulated value exceeds an upper limit or a lower limit; and wherein
said first comparator means includes means for lowering said upper limit and for raising said lower limit when said impulse response at said sampling phase is smaller than said first reference level and makes higher said upper limit and for lowering said lower limit when said impulse response at said sampling phase is larger than said first reference level.

22. A circuit for obtaining accurate timing information from a received signal, comprising:

impulse response obtaining means for obtaining respective impulse responses from the received signal by sampling the received signal at first, second and third sampling phases which are determined based upon a reference phase of a receiver clock;

initial pull-in means for temporarily extracting a provisional timing signal from the received signal as an initial phase of said reference phase;

initial phase setting means for advancing said initial phase of said reference phase by a predetermined phase difference just after the operation of said initial pull-in means;

previous impulse response register means for holding an impulse response at said first sampling phase in a previous period of said receiver clock, as a first reference level;

first comparator means for comparing said impulse response at said first sampling phase with said first reference level;

timing generation means for generating timings corresponding to said second and third sampling phases, said third sampling phase differs by a predetermined phase difference from said second sampling phase;

second comparator means for comparing said impulse responses at said second and third sampling phases, and for advancing or delaying said reference phase of said receiver clock according to whether said impulse response at said second sampling phase is larger or smaller than said impulse response at said third sampling phase so that a phase corresponding to the maximum value of an overall impulse response is near the center of said second and third sampling phases;

buffer means for accumulating outputs of said second comparator means and outputting individual signals when the accumulated value exceeds an upper limit or a lower limit; and wherein said first comparator means includes means for lowering said upper limit and for raising said lower limit when said impulse response at said first sampling phase is larger than said first reference level and for raising said upper limit and for lowering said lower limit when said impulse response at said first sampling phase is smaller than said first reference level.

23. A circuit for obtaining accurate timing information from a received signal, comprising:

impulse response obtaining means for obtaining respective impulse responses from the received signal by sampling the received signal at first, second and third sampling phases which are determined based upon a reference phase of a receiver clock;

initial pull-in means for temporarily extracting a provisional timing signal from the received signal as an initial phase of said reference phase;

initial phase setting means for delaying said initial phase of said reference phase by a predetermined phase difference just after the operation of said initial pull-in means;

previous impulse response register means for holding an impulse response at said first sampling phase in a previous period of said receiver clock, as a first reference level;

first comparator means for comparing said impulse response at said first sampling phase with said first reference level;

timing generation means for generating timings corresponding to said second and third sampling phases, said third sampling phase differs by a predetermined phase difference from said second sampling phase;

second comparator means for comparing said impulse responses at said second and third sampling phases, and for advancing or delaying said reference phase of said receiver clock according to whether said impulse response at said second sampling phase is larger or smaller than said impulse response at said third sampling phase so that a phase corresponding to the maximum value of an overall impulse response is near the center of said second and third sampling phases;

buffer means for accumulating outputs of said second comparator means and outputting individual signals when the accumulated value exceeds an upper limit or a lower limit; and wherein said first comparator means includes means for lowering said upper limit and for raising said lower limit when said impulse response at said first sampling phase is smaller than said first reference level and for raising said upper limit and for lowering said lower limit when said impulse response at said first sampling phase is larger than said first reference level.

24. A circuit for obtaining accurate timing information from a received signal, comprising:

impulse response obtaining means for obtaining an impulse response from the received signal by sampling the received signal at a first sampling phase which is determined by a reference phase of a receiver clock;

initial pull-in means for temporarily extracting a provisional timing signal from the received signal as an initial phase of said reference phase;

initial phase setting means for advancing said initial phase of said reference phase by a predetermined phase difference just after the operation of said initial pull-in means;

previous impulse response register means for holding an impulse response at said first sampling phase in a previous period of said receiver clock, as a reference level;

comparator means for comparing said impulse response at said first sampling phase with said reference level;

buffer means for accumulating outputs of said comparator means and outputting individual signals when the accumulated value exceeds an upper limit or a lower limit; and wherein said comparator means, at a first stage, lowers said upper limit and raises said lower limit when said impulse response at said first sampling phase is larger than said reference level and raises said upper limit and lowers said lower limit when said impulse response at said first sampling phase is smaller than said reference level; and at a second stage, shifts said reference phase of said receiver clock in a direction the same as or opposite to the direction in which the reference phase of said receiver clock was shifted by a previous operation of said comparator means, according to whether said impulse response at said first sampling phase is larger or smaller than said impulse response in said previous period.

25. A circuit for obtaining accurate timing information from a received signal, comprising:

impulse response obtaining means for obtaining an impulse response from the received signal by sampling the received signal at a first sampling phase which is determined by a reference phase of a receiver clock;

initial pull-in means for temporarily extracting a provisional timing signal from the received signal as an initial phase of said reference phase;

initial phase setting means for delaying said initial phase of said reference phase by a predetermined phase difference just after the operation of said initial pull-in means;

previous impulse response register means for holding an impulse response at said first sampling phase in a previous period of said receiver clock, as a reference level;

comparator means for comparing said impulse response at said first sampling phase with said reference level;

buffer means for accumulating outputs of said comparator means and outputting individual signals when the accumulated value exceeds an upper limit or a lower limit; and wherein said comparator means, at a first stage, lowers said upper limit and raises said lower limit when said impulse response at said first sampling phase is smaller than said reference level and raises said upper limit and lowers said lower limit when said impulse response at said first sampling phase is larger than said reference level; and at a second stage, shifts said reference phase of said receiver clock in a direction the same as or opposite to the direction in which the reference phase of said receiver clock was shifted by a previous operation of said comparator means, according to whether said impulse response at said first sampling phase is smaller or larger than said impulse response in said previous period.

26. A circuit for obtaining accurate timing information from a received signal, comprising:

impulse response obtaining means for obtaining an impulse response from the received signal by sampling the received signal at a given sampling phase which is determined by a reference phase of a receiver clock;

first phase generating means for determining a first sampling phase, comprising subtracting means for subtracting a predetermined phase difference value from the value of said reference phase;

second phase generating means for determining a second sampling phase, comprising adding means for adding said predetermined phase difference value to the value of said reference phase;

comparator means for comparing said impulse responses at said first and second sampling phases with each other, and for shifting said reference phase of said receiver clock to one of said first and second sampling phases corresponding to the impulse response at which is larger than the other; and said first and second phase generating means includes means for decreasing said predetermined phase difference value after each said shift is carried out, and said impulse response obtaining means, first and second phase generating means, and comparator means repeatedly operate until said reference phase falls within a required phase difference from a phase corresponding to a maximum value of an overall impulse response.

27. A circuit according to claim 26, further comprising:

average obtaining means for obtaining an average value of said impulse responses for a predetermined number of periods of said receiver clock; and said comparator means includes means for comparing the average value of the impulse responses at timings corresponding to said first sampling phase with the average value of the impulse responses at timings corresponding to said second sampling phase, and for shifting said reference phase of said receiver clock to one of said first and second sampling phases corresponding to the average value of the impulse responses which is larger than the other; and said first and second phase generating means includes means for decreasing said predetermined phase difference value after said shift is carried out, and said impulse response obtaining means, said first and second phase generating means, said average obtaining means and said comparator means repeatedly operate until said reference phase falls within a required phase difference from a phase corresponding to a maximum value of said impulse response.

* * * * *

UNITED STATES PATENT AND TRADEMARK OFFICE
CERTIFICATE OF CORRECTION

PATENT NO. : 5,056,121

DATED : October 8, 1991

INVENTOR(S) : SHINJI OHTA et al.

It is certified that error appears in the above-identified patent and that said Letters Patent is hereby corrected as shown below:

| | | |
|---|---|---|
| Title Page: | | |
| Item [56] | | References Cited, line 3, delete year "1918" and insert --1984--. |
| Col. 22, | line 63, | Delete "said". |
| Col. 26, | line 39-42, | Delete paragraph. |

Signed and Sealed this

Fourth Day of May, 1993

Attest:

MICHAEL K. KIRK

Attesting Officer     Acting Commissioner of Patents and Trademarks